US012108416B2

United States Patent
Li et al.

(10) Patent No.: US 12,108,416 B2
(45) Date of Patent: Oct. 1, 2024

(54) INTER-TOWER WIRELESS COMMUNICATION NETWORK FOR TERRESTRIAL BROADCASTING SYSTEMS

(71) Applicant: Her Majesty the Queen in Right of Canada, as represented by the Minister of Industry, through the Communications Research Centre Canada, Ottawa (CA)

(72) Inventors: Wei Li, Kanata (CA); Liang Zhang, Ottawa (CA); Yiyan Wu, Kanata (CA); Zhihong Hong, Kanata (CA); Sébastien Laflèche, Gatineau (CA); Douglas Prendergast, Ottawa (CA)

(73) Assignee: Her Majesty the Queen in the Right of Canada, as represented by the Minister Industry, through the Communications Research Center Canada, Ottawa (CA)

( * ) Notice: Subject to any disclaimer, the term of this patent is extended or adjusted under 35 U.S.C. 154(b) by 239 days.

(21) Appl. No.: 17/502,904

(22) Filed: Oct. 15, 2021

(65) Prior Publication Data
US 2022/0159650 A1   May 19, 2022

Related U.S. Application Data

(60) Provisional application No. 63/114,979, filed on Nov. 17, 2020.

(30) Foreign Application Priority Data

May 11, 2021  (CA) ..................................... 3117974

(51) Int. Cl.
*H04W 72/27*  (2023.01)
*H04L 5/14*  (2006.01)
(Continued)

(52) U.S. Cl.
CPC ............... *H04W 72/27* (2023.01); *H04L 5/14* (2013.01); *H04W 72/0446* (2013.01); *H04W 72/0453* (2013.01)

(58) Field of Classification Search
CPC ............ H04W 72/27; H04W 72/0446; H04W 72/0453; H04W 4/06; H04W 84/02;
(Continued)

(56) References Cited

U.S. PATENT DOCUMENTS 9,642,139 B1\* 5/2017 Park .................. H04W 72/0453
2016/0134438 A1\* 5/2016 Marzetta ............. H04L 25/0228
370/315

(Continued)

*Primary Examiner* — Thai Nguyen
(74) *Attorney, Agent, or Firm* — Teitelbaum & Bouevitch; Neil Teitelbaum

(57) ABSTRACT

A broadcast communication system includes a plurality of transmitter tower stations configured to exchange inter-tower communication (ITC) signals to support a wireless ITC network (ITCN). Each TTS includes a transmitter (Tx) antenna, at least one receiver (Rx) antenna, and an ITCN server configured to form outgoing ITC signals for transmitting with the Tx antenna and to process incoming ITC signals received with the at least one Rx antenna. Each of the TTSs is configured to multiplex outgoing ITC signals with broadcast services signals prior to the transmitting and to detect the incoming ITC signals in a wireless signal received with the at least one Rx antenna. Several ITCN-integrating broadcast systems operating in a same or different frequency band may be interconnected to support an integrated inter-tower wireless communication network.

17 Claims, 18 Drawing Sheets

(51) Int. Cl.
*H04W 72/0446* (2023.01)
*H04W 72/0453* (2023.01)

(58) Field of Classification Search
CPC ... H04W 92/24; H04W 84/045; H04W 88/08; H04L 5/14
See application file for complete search history.

(56) References Cited

U.S. PATENT DOCUMENTS

| | | |
|---|---|---|
| 2016/0353401 A1* | 12/2016 | Tapia .................. H04W 24/02 |
| 2017/0346525 A1* | 11/2017 | Stirling-Gallacher ...................... H04W 16/28 |
| 2018/0309480 A1* | 10/2018 | Liang .................. H04B 1/1018 |
| 2019/0222375 A1* | 7/2019 | Wu ...................... H04L 5/0035 |
| 2020/0252847 A1* | 8/2020 | Park .................... H04W 88/14 |

* cited by examiner

INTER-TOWER WIRELESS COMMUNICATION NETWORK FOR TERRESTRIAL BROADCASTING SYSTEMS

CROSS REFERENCE TO RELATED APPLICATIONS

This application claims priority from U.S. Provisional application No. 63/114,979, filed Nov. 17, 2020, entitled "Integrated Inter-Tower Wireless Network for Terrestrial Broadcasting and Multicasting Systems", and CA application No. 3,117,974 filed May 11, 2021, both of which are incorporated herein by reference.

TECHNICAL FIELD

The present disclosure generally relates to wireless communication systems, and more particularly to wireless multicast/broadcast communication systems using a plurality of transmission towers.

BACKGROUND

In traditional terrestrial broadcast systems, backhaul data is delivered from a broadcast gateway to broadcast transmitters via studio-to-transmitter links (STL). The STL links are usually implemented using wired connections or dedicated microwave links, both suffering from issues with availability and cost. For the legacy high-power-high-tower (HPHT) deployments, where a single tower covers an entire city, these solutions are affordable.

However, new generation terrestrial broadcasting systems, such as the ATSC 3.0, single-frequency-network (SFN) with multiple lower-power transmitters becomes more attractive in comparison to the traditional single-transmitter HPHT system, in order to deliver mobile services to portable/handheld and indoor receivers, and to support higher service quality. With the number of transmitters increasing, the existing STL solutions quickly become unaffordable. To address this challenge, a one-way wireless in-band backhaul technology to feed broadcast SFN transmitters has been described in U.S. Pat. No. 10,771,208, which is incorporated herein by reference for all purposes.

SUMMARY

An aspect of the present disclosure relates to a terrestrial broadcast system (BCS) comprising: a plurality of transmitter tower stations (TTSs), each having a transmitter (Tx) antenna, the plurality of TTSs comprising: a first TTS configured to wirelessly transmit a first Tx signal comprising a broadcast service signal and an inter-tower communication (ITC) signal, and a second TTS configured to wirelessly transmit a second Tx signal comprising a broadcast service signal and an ITC signal, wherein each of the first and second TTSs comprise at least one receiver (Rx) antenna for receiving an ITC signal originating from the other of the first and second TTS. The BCS further comprises first and second ITC network (ITCN) servers in communication with the first and second TTSs, respectively, for supporting an ITC network comprising the first and second TTSs.

In some implementations, the Rx antennas of the first and second TTSs may be configured to support a bi-directional ITC link between the first and second TTSs. In some implementations, the Rx antennas of the first and second TTSs may be configured to support two-way ITC between the first and second TTSs via a third TTS.

In any of the above implementations, at least one of the ITCN servers may comprise a packet network interface for communications with a packet communications network external to the BCS.

In any of the above implementations, at least one of the ITCN servers may comprise: data storage for storing at least one of: ITCN management data, datacasting data, and local services data, and/or one or more processors configured to support at least one of: datacasting, a data carousel, backhaul content and data storage, and packet routing.

In any of the above implementations, at least one of the Rx antennas may comprise a directional Rx antenna, the directional Rx antenna being reconfigurable for receiving wireless signals selectively from different TTSs of the BCS. In any of the above implementations, at least one of the TTSs may be configured to process a received wireless signal to compensate for a loopback signal from the Tx antenna thereof. The at least one of the TTSs may comprise a receiver signal processor coupled to the Rx antenna and configured to supress the loopback signal.

In any of the above implementations, at least one of the TTSs may be configured to combine the broadcast service signal and the ITC signal using at least one of: layered division multiplexing (LDM), frequency division multiplexing (FDM), and time division multiplexing (TDM). In any of the above implementations, at least one of the TTSs may be configured to provide the ITC signal thereof in a second LDM layer or in a third LDM layer.

In any of the above implementations, the second TTS may comprise an on-channel repeater (OCR) for re-transmitting, with the second Tx signal, the broadcast service signal received from the first TTS, the OCR being configured to superimpose ITC signals upon the broadcast service signal of the first TTS prior to the re-transmitting as an added LDM layer. The OCR may comprise a signal processor configured to perform at least one of: framing ITC signals, coding ITC signals, and modulating ITC signals onto an RF carrier. The OCR may further comprise a circuit for extracting the ITC signal from the received first Tx signal.

In any of the above implementations, the first and second TTSs may be configured to transmit the ITC signals in a broadcast-allocated channel using a full-duplex or half-duplex transmission mode. In any of the above implementations, at least one of the TTS may be configured to transmit the broadcast services signal and the ITC signal in different frequency bands. In any of the above implementations, at least one of the TTSs may be configured to transmit the broadcast services signal in a first frequency band, and to receive an ITC signal in a second frequency band that is different from the first frequency band.

In any of the above implementations, the plurality of TTSs may include at least a third TTS comprising a third ITCN server, wherein each of the ITCN servers may be configured to communicate with at least another one of the ITCN servers using the ITC signals to route ITC data transmission between the first and second TTSs via the third TTS.

In any of the above implementations, the ITCN server of at least one of the TTSs may be configured to process internet protocol (IP) packets for routing to another TTS using the ITC signal. The IP packets may comprise IP packet streams received from an external IP network, for over-the-air routing via two or more TTSs to a destination IP address.

In any of the above implementations, the first TTS may comprise a receiver configured to process ITC signals received from another BCS.

A second aspect of the present disclosure provides a BCS comprising: a plurality of TTSs configured to exchange ITC signals to support a wireless ITC network (ITCN), each TTS from the plurality comprising: a transmitter (Tx) antenna, at least one receiver (Rx) antenna, and an ITCN server configured to form outgoing ITC signals for transmitting with the Tx antenna and to process incoming ITC signals received with the at least one Rx antenna; wherein each TTS from the plurality is configured to multiplex outgoing ITC signals with broadcast services signals prior to the transmitting and to detect the incoming ITC signals in a wireless signal received with the at least one Rx antenna.

In at least some implementations of the BCS according to the second aspect, each TTS from the plurality may be configured to support two-way messaging with another TTS from the plurality using the ITC signals. In same or different implementations of the BCS according to the second aspect, at least one of the TTSs may be configured to relay the ITC signals, or signals or data comprises in said ITC signals, between two other TTSs from the plurality. In at least some implementations, the Rx antenna of a first TTS from the plurality comprises a first directional Rx antenna configured to receive wireless signals from a second TTS from the plurality, and the at least one Rx antenna of the second TTS comprises a directional Rx antenna configured to receive wireless signals from the first TTS. In some implementations the at least one Rx antenna of the first TTS may further comprise a second directional Rx antenna configured to receive wireless signals from a third TTS, wherein the ITCN server of the first TTS is configured to separately process ITC signals comprised in the wireless signals from the second and third ITC. In some implementations the first Rx antenna may be adaptive, and the first TTS may comprise a controller operable to redirect the first Rx antenna to receive wireless signals from a third, different TTS.

In any of the above implementations of the BCS according to the second aspect, each ITCN server may be configured to support two-way internet protocol (IP) communications with an ITCN server of another TTS, the IP communications being carried by the ITC signals.

In any of the above implementations of the BCS according to the second aspect, at least one of the ITCN servers may comprise a packet network interface for communicating with an external packet network, and a packet traffic controller configured to process data packets received from the interface for storing at the ITCN server or transmission with the outgoing ITC signals, and to process data packets received with the incoming ITC signals for storing at the ITCN server or routing to the external packet network.

In any of the above implementations of the BCS according to the second aspect, the ITCN server of at least one TTS from the plurality comprises data storage for storing at least one of: datacasting data, local services data, ITCN management data, backhaul information for local broadcasting, and wherein the at least one of ITCN servers is configured to select stored data for at least one of: transmitting to another TTS with an outgoing ITC signal, or broadcasting to a local broadcast area with the broadcast services signal.

In any of the above implementations of the BCS according to the second aspect, at least some TTSs from the plurality may be configured to multiplex the outgoing ITC signals with the broadcast services signals using layered division multiplexing (LDM).

In any of the above implementations of the BCS according to the second aspect, at least one TTS from the plurality may be configured to transmit the broadcast signal and the outgoing ITC signal in different frequency bands.

In any of the above implementations of the BCS according to the second aspect, at least one TTS from the plurality may be configured for receiving the incoming ITC signal in a frequency band different from a transmission frequency band of said TTS.

In any of the above implementations of the BCS according to the second aspect, at least one TTS from the plurality may comprise an OCR configured for re-transmitting a signal wirelessly received from another TTS, the OCR being configured to superimpose the outgoing ITC signal upon the received signal prior to re-transmitting. In some implementations, the OCR may be configured to superimpose the outgoing ITC signal as a third LDM layer. In some implementations, the OCR may comprise a circuit for extracting the incoming ITC signal from the wirelessly received signal.

In any of the above implementations of the BCS according to the second aspect, at least one of the TTSs may be configured to process a received wireless signal to compensate for a loopback signal from the Tx antenna thereof.

In any of the above implementations, the BCS may be configured as a single-frequency network wherein the plurality of TTSs transmit the broadcast services signals and the ITC signals in a same shared frequency band, wherein at least one of the TTSs is configured to receive ITC signals from a second wireless network over a different frequency band, for supporting an integrated inter- tower wireless network comprising the BCS and the second wireless network.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

Embodiments disclosed herein will be described in greater detail with reference to the accompanying drawings, which are not to scale, in which like elements are indicated with like reference numerals, and wherein:

FIG. 14 is a schematic diagram illustrating 3-Layer LDM signal blocks for delivering mobile, fixed, backhaul, and ITND services;

FIG. 15 is a schematic diagram illustrating example 3-Layer LDM signal blocks for an OCR implementation;

DETAILED DESCRIPTION

Figure 1:
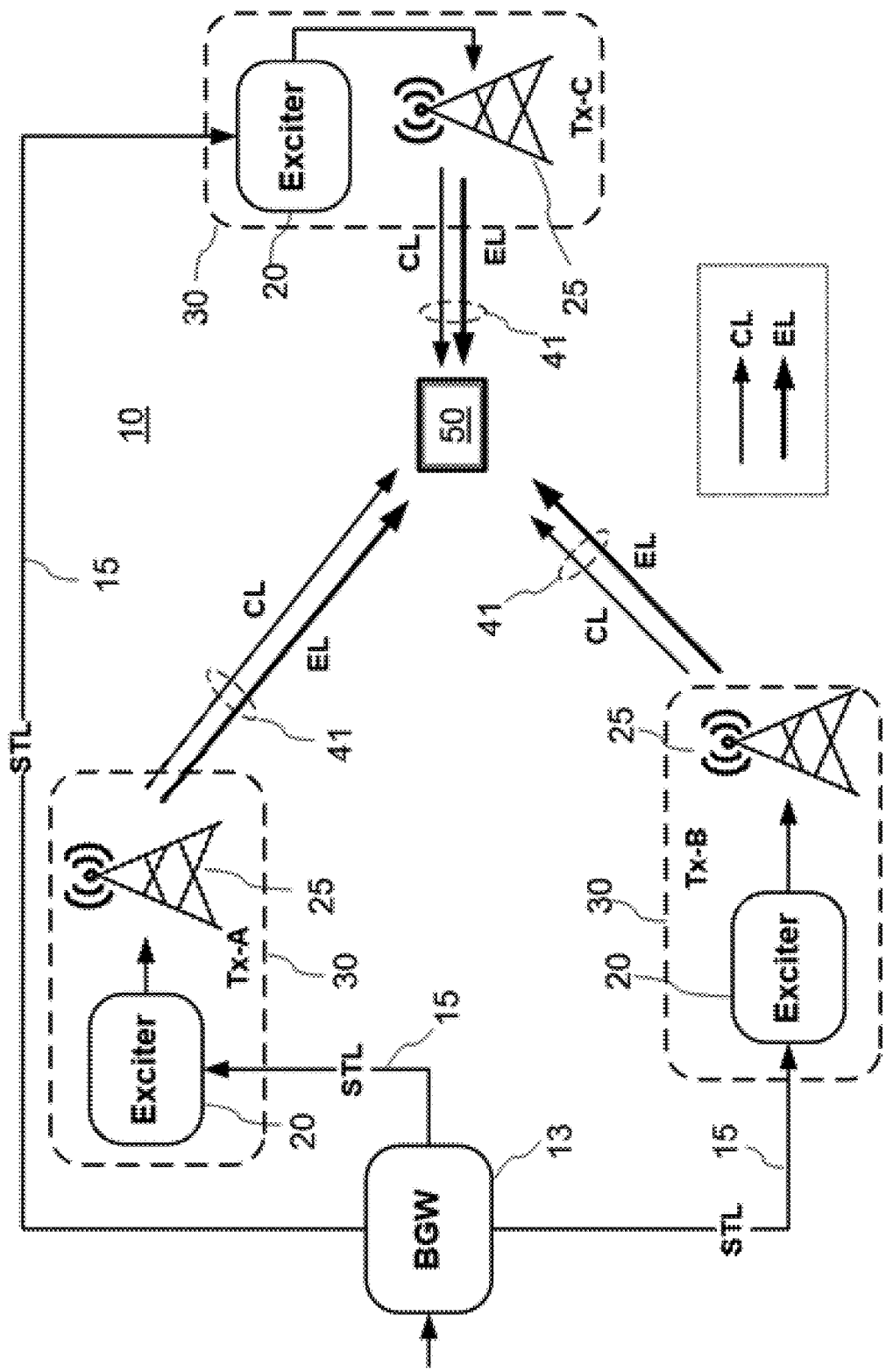
FIG. 1 is a schematic diagram of an example single frequency network (SFN) broadcast system (BCS)

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Note that as used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

The term "in-band", when used with reference to a transmission signal carrying service signals to end-users, is used to mean transmitting within a frequency band allocated to the service signals, or within a frequency band that at least partially overlaps the frequency band of the service signals. The terms "broadcasting" and variants thereof encompass multicasting and corresponding variants.

The present disclosure describes a multi-tower terrestrial broadcast system (BCS) configured to integrate an inter-tower communications network (ITCN) supporting two-way communications among broadcasting transmitters. In some implementations, an ITCN may include two-way, e.g., bi-directional, wireless communications links between broadcasting transmitter towers. In some implementations, the BCS may be an SFN configured to support full duplex or half-duplex wireless in-band communications between two or more transmitter towers thereof. Inter-tower communication (ITC) links may be integrated with broadcast services over allocated broadcast channels. Layered division multiplexing (LDM) may be used for broadcasting, multicasting, datacasting, two-way inter-tower communications, and SFN operations.

One or more transmitter tower stations (TTSs) may include local ITCN servers (also termed Broadcast Nodes, or bcNodes) configured to support two-way communications with other participating TTS over the ITC links, e.g., for data and/or message relay, control signaling and transmission coordination, and providing reconfigurable backhaul data links and datacasting services over the broadcast network. An ITCN server may store data for non-real-time (NRT) local datacasting and local content broadcasting, whereby different TTSs can broadcast/datacast different local contents. An ITCN server may be configured to communicate to other servers in the network, e.g., to set up data links, coordinate transmission schedules as needed, and perform other functions that are commonly performed by network and data servers in a network. An ITCN server may be configured with an interface to an external packet network, enabling data packet ingress/egress and routing over ITC links.

An ITCN, and ITCN servers thereof, may also be configured to implement, using the over-the-air broadcast signal, datacasting and other local and regional services including e.g., emergency alert services, internet of things (IoT) services, connected-car services, software update services, messaging, etc. Signals carrying these services may be broadcasted to end users in a local broadcast area of a TTS, or transmitted as ITC signals from one TTS to another TTS for coordinated broadcasting or broadcasting in a different broadcast area.

ITC links may be configured within a radio frequency (RF) band allocated for broadcast services, with ITC signals and broadcast service signals transmitted using a same service waveform, e.g., as defined in ATSC 3.0 or similar standards. In some implementations, ITC signals may be carried within one or more signal layers of an LDM signal, such as e.g., the Enhanced Layer of the ATSC 3.0, or a third LDM layer (L3). In some implementations, ITC signals carried in one signal layer may support services delivered in another signal layer. In some implementations, ITC signals may not share a signal waveform with other service signals.

Some implementations may comprise an LDM transmission system supporting multi-hop transmission of ITC signals, e.g., for datacasting, IoT, message relay, and/or controlling operations. Time delays may be applied at relay stations of multi-hop links to time-coordinate respective operations.

In some implementations, an ITC link may be implemented on a dedicated TV channel, which may be shared by multiple broadcast operators. Different broadcast operator sharing a BCS, e.g., a SFN BCS, may operate distinct ITCNs defined therewithin, which may coordinate their transmissions. In some implementations ITC links operated by different operators may be multiplexed using a time-division multiplexing (TDM), frequency-division multiplexing (FDM), LDM, or some combination thereof.

In at least some SFN implementations, ITCN-participating TTSs may implement signal isolation and signal processing methods to cancel, or at least reduce, a co-channel interference signal, termed loopback signal, from the broadcast antenna to an ITCN receive antenna on the same transmission tower.

In some implementations, an ITC link may include a suitably configured on-channel repeater (OCR). An OCR may be used in a terrestrial broadcasting system to provide additional coverage or to fill coverage holes. Instead of constructing a broadcast signal from backhaul information, an OCR amplifies and re-transmits an over-the-air (OTA) broadcast signals received from another transmitter tower station (TTS). An OCR may also equalize the received signal to remove or at least lessen multipath and other signal interferences, but does not typically detect nor extract backhaul information from the received signal. OCRs may be classified into analog types, which may perform radio frequency (RF) and intermediate frequency (IF) processing, digital types, which may include a feedback interference canceler (FIC) and/or an equalizer, and mixed-signal type that combine analog and digital signal processing. To establish an OTA ITC link to another OCR and/or a primary TTS, an OCR may be configured to superimpose ITC signals, e.g., as an added LDM layer, over an amplified and/or equalized broadcast signal received over the air. An OCR typically does not perform LDM demodulation or demultiplexing of first two signal layers carrying broadcast service signals common with other TTSs of the BCS.

An OCR may include a receiving antenna, a band pass filter, one or more low noise amplifier(s), and a power amplifier connected to the transmitting antenna. It may down-convert the input signal to intermediate frequency (IF). In some embodiments, the signal may be down-converted to baseband, which gives the possibility of making error corrections before retransmission. In comparison to an In-Band Relay Station (IBRS) utilizing in-band backhaul information to generate its broadcast signal, an OCR may have the advantage of simplicity and spectrum saving, as there may be no need to use service spectrum for backhaul signal delivery.

An aspect of the present disclosure provides a wireless broadcast communication system comprising two or more TTSs configured for point-to-multipoint transmission and point-to-point reception. The point-to-multipoint transmission may support wireless delivery of datacasting services, IoT services, and/or tower-to-tower communications integrated with broadcast service delivery, using LDM to transmit multiple-layer signals with different power levels over the same or different radio frequency channel; wherein at least a part of an LDM signal layer is used to support two-way ITC signalling between different TTSs. Delay adjustment between ITC signals and broadcast service signals may be used to coordinate the transmission of some common services by different TTSs within an SFN; at least some TTSs may be configured to decode incoming ITC signals from the received LDM signal, generate a broadcast signal waveform carrying outgoing ITC signals, and emit the waveform, in some implementations at a designated time to achieve a coordinated SFN operation.

In some implementations, e.g., in a SFN implementation wherein the point-to-multipoint transmission and point-to-point reception share a frequency spectrum, a smart antenna array may be used to maximize the reception of a wanted wireless signal from another TTS, to reduce the co-channel interference signal from the co-located broadcast antenna, i.e. the loopback signal, and/or RF signal interference from other SFN transmitter towers, and/or to reduce multipath distortion for the wanted signal and multipath of the loopback signal. Signal cancellation techniques may be used in digital or analog domains to cancel the loopback signal and co-channel interference from other SFN transmitter towers.

ITCNs of several broadcast SFNs may be interconnected, e.g., by tower-to-tower wireless links, to form an integrated inter-tower wireless network (IITWN) for terrestrial broadcasting systems. An IITWN may connect SFN networks operating on a same radio frequency or different radio frequencies. An IITWN may also include one or more multi-frequency networks (MFN).

Some implementations may use a three-layer LDM, where the first LDM layer (L1) and the second LDM layer (L2) are used for regular broadcast operation, and the third LDM layer (L3) may be reserved for ITC signals. In some implementations, two-way ITC signalling in L3 between two TTSs, e.g., a primary TTS and an OCR, may be organized in a half-duplex scheme, based on time-frame duplex, where time-frames of ITC transmission may be controlled by ITCN servers of participating TTSs. Some implementations may use a full duplex ITC transmission in L3, which may be combined with robust coding and modulation, with SNR threshold that may be set at a negative dB number. In such implementations an OCR may superimpose outgoing ITC signals, encoded using robust encoding and/or modulation techniques, over the received and processed broadcast signal without first removing incoming L3 signals therefrom.

An ITCN server may implement a smart management system for directing incoming data traffic, such as IP traffic from various broadcast facilities, e.g., video and audio studios, home studios, other sources of real-time and non-real-time (NRT) data for data casting, other IITWCN towers, or other IP networks. The smart management system of an ITCN server may be configured to direct incoming data traffic depending on the usage and network conditions, and may modify IP packet headers accordingly. ITCN servers of participating TTSs of an IITWCN may communicate with each other, e.g., by using UDP/IP or TCP/IP messaging, e.g., to route and manage the IP traffic over ITC links. In some embodiments ITCN servers may operate to reconfigure the network topology the IITWCN.

Examples described below relate to a wireless BCS that includes a plurality of TTS, at least two of which being configured to support two-way wireless communications to form an ITCN. In some implementation, said TTSs may use at least one of: LDM, TDM, and FDM to transmit tower-to-tower (T2T) signals that are multiplexed, in-band or out of band, with broadcast service signals intended for end-users. The TTSs may further include wireless receivers comprising receiver (Rx) antennas for receiving the T2T signals, and Rx signal processors operatively coupled thereto. The T2T signals may include at least one of: backhaul (BH) signals carrying broadcast service information for broadcasting by another TTS, and ITC signals. The ITC signals may include, e.g., communication signals carrying data payload intended for local use or further routing, and ITCN and/or TTS control signals, and typically do not carry backhaul data for SFN-wide broadcast services. In some implementations, the ITC signals may be used to deliver e.g., one or more of the following: operational, administration, and management signaling related to the operation of one or more TTSs and to coordinate ITC signal transmission between participating TTSs (e.g., hand-shake signalling and the like); backhaul for flexible localized broadcast/datacast services; emergency alerts, which may comprise multimedia content, and other signals. In some implementations, ITCN-participating TTSs may be configured to use an in-band communication channel to exchange the ITC signals. In some implementations, the ITCN-participating TTSs may comprise ITCN servers for supporting the ITCN. In some implementations, one or more of the TTSs may be configured for in-band or out-band transmission of locally stored data. In some implementations, one or more of the TTSs may comprise ITCN servers interfacing an external packet network, e.g., an IP network, and may be configured for in-band or out-band transmission of data ingress from the external packet network.

ITC links between TTSs may be implemented, for example, using a 2-layer or a 3-layer LDM. The 2-layer LDM is a non-orthogonal multiplexing (NOM) technique that was adopted by ATSC 3.0, and may provide a high throughput when delivering services with different quality of service (QoS) requirements over the same channel. In LDM, multiple signal layers are transmitted over the same time and frequency radio resource, where each signal layer may deliver services with a specific QoS requirement.

In some embodiments, adjacent TTSs may be configured to establish wireless bi-directional communication links by exchanging ITC signals therebetween. Adjacent TTSs may be for example two TTSs of a same SFN BCS, or two different BCSs, which towers are located within a line-of-sight (LOS) from each other. ITCNs of two or more different BCSs may be interconnected, e.g., using T2T links between LOS towers of the different BCSs, to form a broad-area integrated inter-tower wireless communication network (IITWCN).

FIG. 1 illustrates a wireless broadcast communication system (BCS) 10 that delivers services to end-users 50 from a plurality of TTSs. BCS 10 may be for example a terrestrial digital TV SFN configured to operate in accordance with ATSC 3.0 standards. In the illustrated example BCS 10 includes three TTSs 30 that are labeled "Tx-A", "Tx-B", and "Tx-C". Each TTS 30 includes an exciter 20 and a transmitter (Tx) antenna 25, which may be located on a transmission tower. A broadcast gateway (BGW) 13 is responsible for sending backhaul (BH) information to each TTS 30 via dedicated backhaul links 15. The BH information includes service data for the network-provided services. In some embodiments BH signals carrying the backhaul information to each TTS 30 via backhaul links 15 may be defined in accordance with a studio-to-transmitter link (STL) interface, for example as specified in the ATSC 3.0 Standards, or other applicable industry standards. Accordingly, the backhaul links 15 may also be referred to as STL links, and the backhaul information or data may be referred to as the STL information or STL data, respectively. The backhaul information may also include control information that determines transmission parameters in the network, such as transmission timing offsets, frequency offsets, transmission power, etc. Exciters 20 generate transmission waveforms based on the backhaul information using a suitable communication format, for example as defined by ATSC 3.0, and feed them to the Tx antennas 25 for broadcasting as wireless transmission (Tx) signals 41.

BCS 10 may be configured to deliver mixed mobile and fixed services using LDM technology. LDM is a multi-layer non-orthogonal signal multiplexing technology which is adopted by the ATSC 3.0 standard, and in which signals carrying different types of services are superimposed in layers, for example combined at different power levels. LDM allows achieving higher cumulative transmission capacity when delivering multiple services with different quality requirements. In a typical application scenario for a two-layer LDM, the higher-power layer, which is termed Core Layer (CL or L1) in ATSC 3.0, may be configured to deliver robust signals, targeting mobile, handheld, and indoor receivers. A second layer with relatively lower power is termed Enhanced Layer (EL or L2) in ATSC 3.0, and may be used for example to deliver high-throughput signals to fixed receivers with roof-top or other powerful antenna systems, which can provide high signal-to-noise ratio (SNR) conditions for received signals of relatively low power. EL signals may also target a localized high-density area with limited coverage distance. Aspects of LDM technology are described in U.S. Pat. No 9,479,826, which is assigned to the assignee of the present application, and which is incorporated herein by reference.

BCS 10 may represent a conventional ATSC 3.0 SFN, in which STL links 15 may be implemented using either optical fiber links or dedicated wireless microwave links. Deploying each additional TTS 30 requires adding an STL link 15 to deliver the service data and control signaling from the BGW 13. However optical fiber links are not always available at desired locations, and are expensive to rent. Dedicated microwave backhaul equipment may also be expensive to install. Furthermore, additional microwave spectrum, which may be required for backhaul data transmission over a dedicated wireless link, is a scarce resource for wireless broadband services.

The increased capacity associated with modern multiplexed transmission formats, such as the LDM, provides an opportunity to open communication channels between different TTSs of an SFN, in addition to delivering service data to end-users, all using the same TV spectrum. By adding inter-tower communication links to the SFN, wireless in-band distribution of backhaul information to newly added TTS becomes possible, offering lower infrastructure and operational costs in combination with high spectrum efficiency. Examples of broadcast/multicast communication systems with in-band backhaul (IBBH) distribution are described in U.S. Pat. No. 10,771,208, which is assigned to the assignee of the present application and is incorporated herein by reference.

Figure 2:
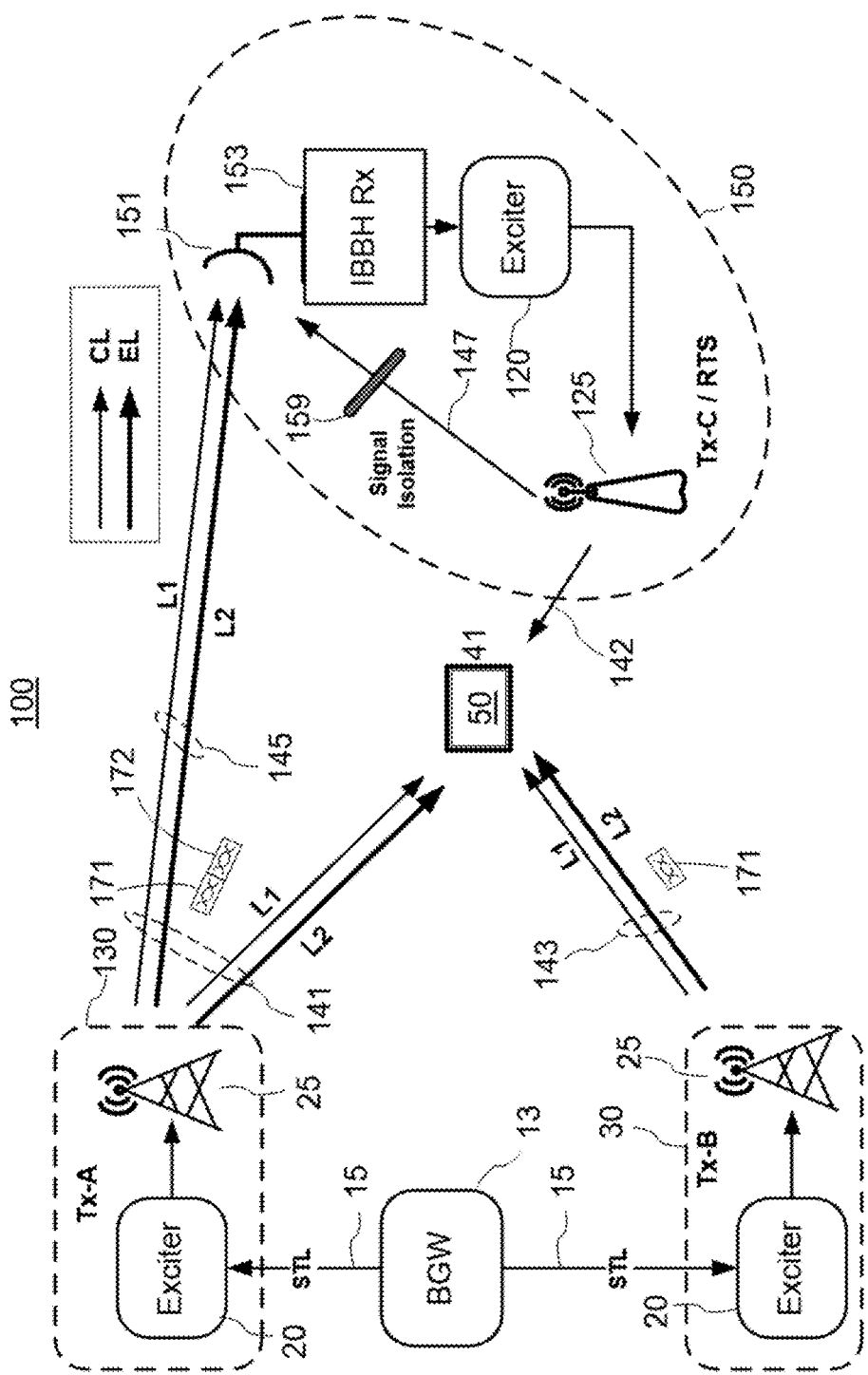
FIG. 2 is a schematic diagram of an example SFN BCS with over the air in-band backhaul delivery to a relay transmission station.

FIG. 2 illustrates a modification of BCS 10, generally referred to as BCS 100, in which the third TTS 30, i.e. Tx-C, is replaced with a TTS 150 that does not have a dedicated STL link to a BGW. TTS 150 may be deployed, e.g., where no dedicated backhaul link is available, for example at a remote location. Instead of deploying a new dedicated backhaul link, backhaul information may be delivered to the third TTS 150 in-band with a Tx signal 141 from one of the TTS of the BCS 100, e.g., TTS 130. The TTS 130, which may be referred to as a primary TTS (PTS) or anchor TTS, may be a modification of the first TTS 30 of BCS 10, "Tx-A", configured to incorporate the BH information in its transmission (Tx) signal 141. The Tx signal 141 emitted by the PTS 130, which may be referred to as the first Tx signal (Tx1) 141, thus may comprise service signals 171 carrying services to the end-users 50 and in-band backhaul (IBBH) signals 172. The IBBH signals 172 carry BH data, which are to be re-transmitted as broadcast service signals by the third TTS 150.

The third TTS 150 is a relay transmitter station (RTS), and may also be referred to as the in-band relay station (IBRS) 150 in embodiments with in-band backhaul delivery. It includes a receiver (Rx) antenna 151 that is coupled to a relay signal processor 153. The relay signal processor 153 connects to a Tx signal generator 120, which in turn connects to a Tx antenna 125 of RTS 150. The Tx signal generator 120 of RTS 150 may be configured to perform generally the same functions as the exciters 20, i.e. to form a transmission waveform based on backhaul information, and may also be referred to as the exciter 120. The Rx antenna 151 of RTS 150 may be positioned where it can receive the Tx1 signal 141, for example in the LOS path from the Tx antenna 25 of the PTS 130. The relay signal processor 153 of RTS 150, which may also be referred to as the in-band backhaul receiver (IBBH Rx) 153, may be configured to extract the IBBH signals 172 from the wireless signal received by the Rx antenna 151. The exciter 120 may be configured to generate transmission waveforms based on broadcast service data carried with the IBBH signals 172, and feed them to the Tx antenna 125. The Tx antenna 125 is configured to wirelessly transmit the transmission waveforms as a second transmission (Tx2) signal 142 to end-users 50 located in a coverage area of the Tx antenna 125.

The Tx1 signal 141 carrying backhaul data to RTS 150 may be an LDM signal having at least two LDM layers, a first LDM layer "L1" and a second LDM layer "L2". The first LDM layer may be referred to herein as the L1 signal layer or simply as the L1 layer. The second LDM layer "L2" may be referred to herein as the L2 signal layer or simply as the L2 layer. The L2 signals may be superimposed over L1 signals at a lower power level. By way of example, L2 signals may be at least 5 dB lower, or at least 10 dB lower in power than the L1 signals. In some embodiments the higher-power L1 layer may correspond to the CL defined in ATSC 3.0, while the lower-power L2 layer may correspond to the EL defined in ATSC 3.0. In some embodiments the higher-power L1 layer may be configured to deliver robust signals carrying mobile broadcast services (MBS) for mobile, handheld, and indoor receivers. The lower-power L2 layer may be configured to deliver high-throughput signals carrying fixed broadcast services (FBS) to users with fixed roof-top or other powerful antenna systems, which can provide high signal-to-noise radio (SNR) conditions. The L2 layer signals may also target a high-density localized area with limited coverage distance. Other systems may use different allocation of services between the L1 and L2 layers. In some embodiments the L2 layer signals may be superimposed over the L1 layer signals at a substantially same power level. In this case, L1 signals may be configured with a negative SNR threshold to achieve good signal detection. For example, ATSC 3.0 defines the power injection level of L2 layer signals relative to L1 layer signals from 0 to −25 dB, in steps of 0.5 dB. A typical application scenario may be to simultaneously deliver time and frequency synchronized L1 and L2 signals super-imposed within the same frequency band. At the receiver side, L1 signal may be decoded using a conventional single layer receiver considering L2 as noise or interference. L2 signal may be detected using successive signal cancellation (SSC), which decodes, re-encodes the L1 signal, and cancels it from the received LDM signal. After the SSC, the L2 signal detection follows conventional signal detection process.

In an example embodiment, the in-band backhaul delivery using LDM may be performed as follows. The broadcast service signals 171 carrying services targeted to end users, termed broadcast (BC) services, are delivered to end-users 50 in L1 and L2 from TTSs 30, 130 and to the RTS 150. The L1 and/or L2 data backhaul may be delivered to RTS 150, for example, using a part of the L2 signal. The relay signal processor 153 decodes the IBBH data and sends it to exciter 120 of the IBRS for coding, waveform modulation, and re-transmission by the antenna 125 of the IBRS. In some embodiments the IBBH signals 172 may be L2 signals that use more spectrum efficient modulation and channel coding, in comparison to broadcast service signals 171 on L1 and L2, to reduce spectrum usage.

To time synchronize the emission and/or delivery of the L1 and L2 broadcast service signals 171 from all SFN transmitters, the IBBH signals 172 may be sent to RTS 150 earlier than the corresponding service signals 171. The time delay between the service signals 171 and the corresponding IBBH signals 172 may be sufficiently long to allow the RTS 150 to decode the L2 backhaul signal, re-encode and modulate the L1 and L2 signals for time synchronized SFN emission.

The Rx antenna 151 may be installed at a high location at the RTS tower, to achieve a good channel condition from PTS 130, preferably a LOS channel. In some embodiments, it may be a directional high-gain antenna. In some embodiments it may be a reconfigurable directional antenna, e.g., as described below. At the RTS 150, an RF signal barrier or shield 159 may provide some signal isolation between the Rx antenna 151 and the Tx antenna 125 to lessen a loopback signal 147 from the Tx antenna 125 at the Rx antenna 151. A loopback signal cancellation algorithm may be implemented at the relay signal processor 153 to reduce the impact of the loopback signal 147 onto the decoding of the backhaul signal. After the cancellation of the loopback signal, an LDM demultiplexing algorithm may be used to recover the backhaul data on L2. In some embodiments the BCS 100 may include two or more RTS 150 that can work in a cascade, when one RTS transmits IBBH data to another RTS, using either the LDM or TDM technologies.

The presence of the Rx antenna 151 coupled at the relay Rx 153 at the RTS 150 allows establishing a tower-to-tower (T2T) communication link 145 from PTS 130 to RTS 150. This wireless T2T link may be used to transmit data for SFN and non-SFN broadcast services, and may further transmit control signaling to configure the transmission parameters at the RTS 150, for SFN transmitter coordination, including frame-structure, modulation and coding schemes, and the timing offset at the RTS 150 to optimize the SFN coverage.

In FIG. 2, the T2T link 145 between PTS 130 and RTS 150 is one-directional, with the IBBH signals 172 being transmitted from the PTS 130 to the RTS 150. The BCS 100 may be further modified to support an integrated ITCN, in which two or more TTSs may exchange communications. In some embodiments such a BCS-based wireless ITCN may connect to external packet-based communication networks to support packet data ingress and/or egress, and T2T routing of packet data traffic originating from an external packet network. In some embodiments, an ITCN may be configured with wireless bi-directional inter-tower communication links defined within a wireless broadcast SFN. In some embodiments, an ITCN may support bidirectional, i.e. two-way, communications between two TTSs of the BCS via one or more other TTSs, e.g., in a ring-like network configuration. Different broadcast SFNs implementing such ITCNs may be interconnected to form an IITWCN.

Figure 3:
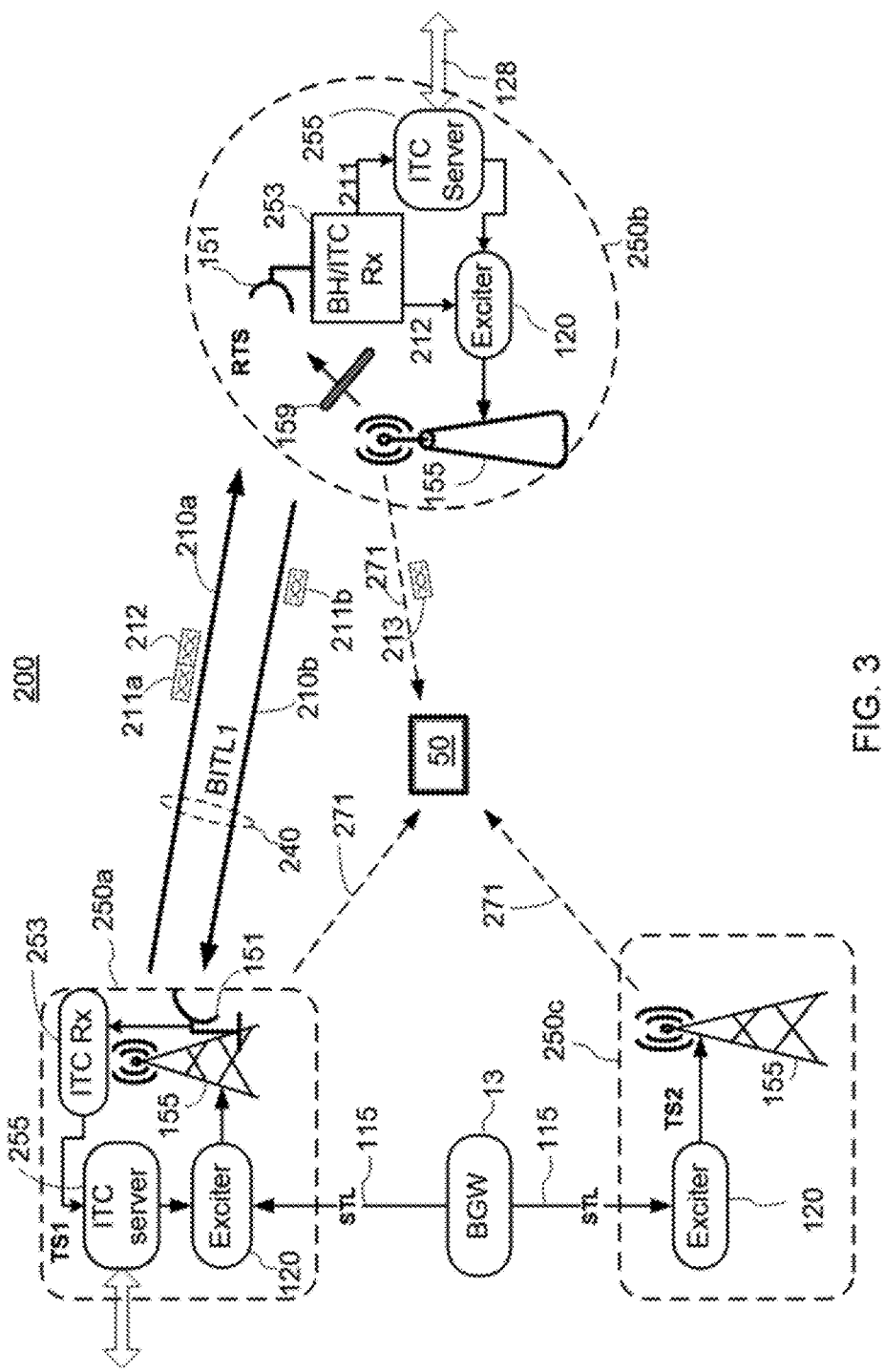
FIG. 3 is a schematic diagram of an example SFN BCS with a wireless bi-directional inter-tower communications (ITC) link for in-band ITC networking and backhaul delivery.

FIG. 3 illustrates an example BCS 200 having an integrated ITCN interconnecting two of its towers. BCS 200 may be an SFN, for example operating in accordance with ATSC 3.0 standards. It may include two or more TTSs, with three TTSs 250 shown by way of example, i.e. TTS 250a, TTS 250b, and TTS 250c. Each TTS 250 includes a Tx antenna 155 for transmitting wireless RF signals, termed here Tx signals. The Tx signals of each TTS 250 carry at least broadcast service signals 271, e.g., a TV broadcast, intended for end-users 50 within their respective broadcast areas. The Tx signals transmitted by the Tx antennas of at least two of the TTS 250, e.g., TTS 250a and TTS 250b, may further carry T2T signals 210, e.g., T2T signals 210a and 210b shown with arrows in FIG. 3. Each of these T2T signals 210, i.e., 210a and 210b, comprise at least ITC signals 211, e.g., ITC signals 211a or 211b as indicated in FIG. 3, intended for another TTS 250. The ITC signals 211 may include broadcast network cue and control data for network operation and monitoring and not intended for consumer service. ITC signals 211 may also carry consumer or professional service data, such as IoT, emergency warnings, software download, connected car service data, and other localized data services or advertisement, as well as other data and signalling, including those described elsewhere in this document. Some of the T2T signals 210 may further include IBBH signals 212, e.g., as described above with reference to FIG. 2. TTSs 250 and the like, configured to receive and transmit ITC signals, may be referred to herein as participating TTSs.

The ITC signals 211 from each participating TTS 250 may be multiplexed with the broadcast signals 271, e.g., TV broadcast, using TDM, FDM and/or LDM. Some embodiments may support ITC periods, during which participating TTSs 250 may transmit different ITC signals 211 on a same frequency band.

The TTS 250a and 250b, include Rx antennas 151 configured to receive Tx signals from one or more other TTSs, in the illustrated example—from each other. The Rx antennas 151 of at least one of the TTS 250 may be a directional Rx antenna that is aimed selectively at the Tx antenna of another TTS 250 at the transmit end of a T2T link connecting the two TTS. Each Rx antennas 151 is coupled to a co-located signal receiver 253, configured to extract ITC signals 211 and, in some embodiments, IBBH signals 212, from the Rx antenna signal. The signal receivers 253 may also be referred to as ITC Rx 253 or ITC signal processors 253. The ITC signal extraction may include at least one of TDM, FDM, or LDM demultiplexing. In embodiments where ITC signals are carried in the L2 signal layer, the ITC signal extraction may include the SSC as described above. In some embodiments, one or both TTS 250a, 250b may include an RF shield 159 between the Tx antenna 155 and the Rx antenna 151 thereof to lessen a loopback signal from the Tx to the Rx antenna.

In the illustrated embodiment the first TTS 250a is a PTS configured to wirelessly transmit a first Tx signal (Tx1 signal) comprising the broadcast signal 271, e.g., a TV broadcast, and T2T signals 210a, which include ITC signals 211a and IBBH signals 212. The IBBH signals 212 carry broadcast backhaul information for the TTS 250b, which operates in part as an IBRS; the operation of in-band backhaul delivery may be e.g., as described above with reference to FIG. 2, and may be independent on the ITC signalling. In other embodiments, TTS 250b may receive backhaul information for an STL link. The second TTS 250b is configured to wirelessly transmit a second Tx signal (Tx2 signal) comprising a broadcast signal 271 and a T2T signal 210b, and may further include a local broadcast services signal 213 intended to local subscribers, which may carry e.g., datacast and other services provided by the ITCN server 255 of TTS 250b.

The TTS 250a, 250b may further include an ITCN server 255, which is coupled to the corresponding ITC Rx 253. At each of these TTS, the ITC signals 211, or data obtained therefrom, may be passed from the ITC Rx to the local ITCN server 255, where it may be processed and/or stored as need. The ITCN servers 255 may perform a variety of functions, which may include local data storage and data casting, control and coordination of signal transmission and reception within the TTS and/or between participating TTSs, communications with other TTSs, interfacing with an external network, and any combination of thereof. ITCN servers 255 may be configured to use ITC signals 211 for network signalling to establish two-way communications with other participating TTSs, e.g., to establish a bi-directional inter-tower communication link 240 between the TTS 250a and TTS 250b.

In some embodiments one or both of the ITCN servers 255 may include a packet network interface 128 for connecting to an external packet network (not shown). In some embodiments the ITC signals 211, or portions thereof, may be routed to an external packet network via a packet network interface 128 as data egress. The ITCN servers 255 may further provide locally-sourced or ingress data to the exciter 120, where they may be framed, encoded, multiplexed with the broadcast service signals, and modulated onto an RF carrier to be transmitted over the air by the Tx antenna 155 as a wireless Tx signal.

Figure 4:
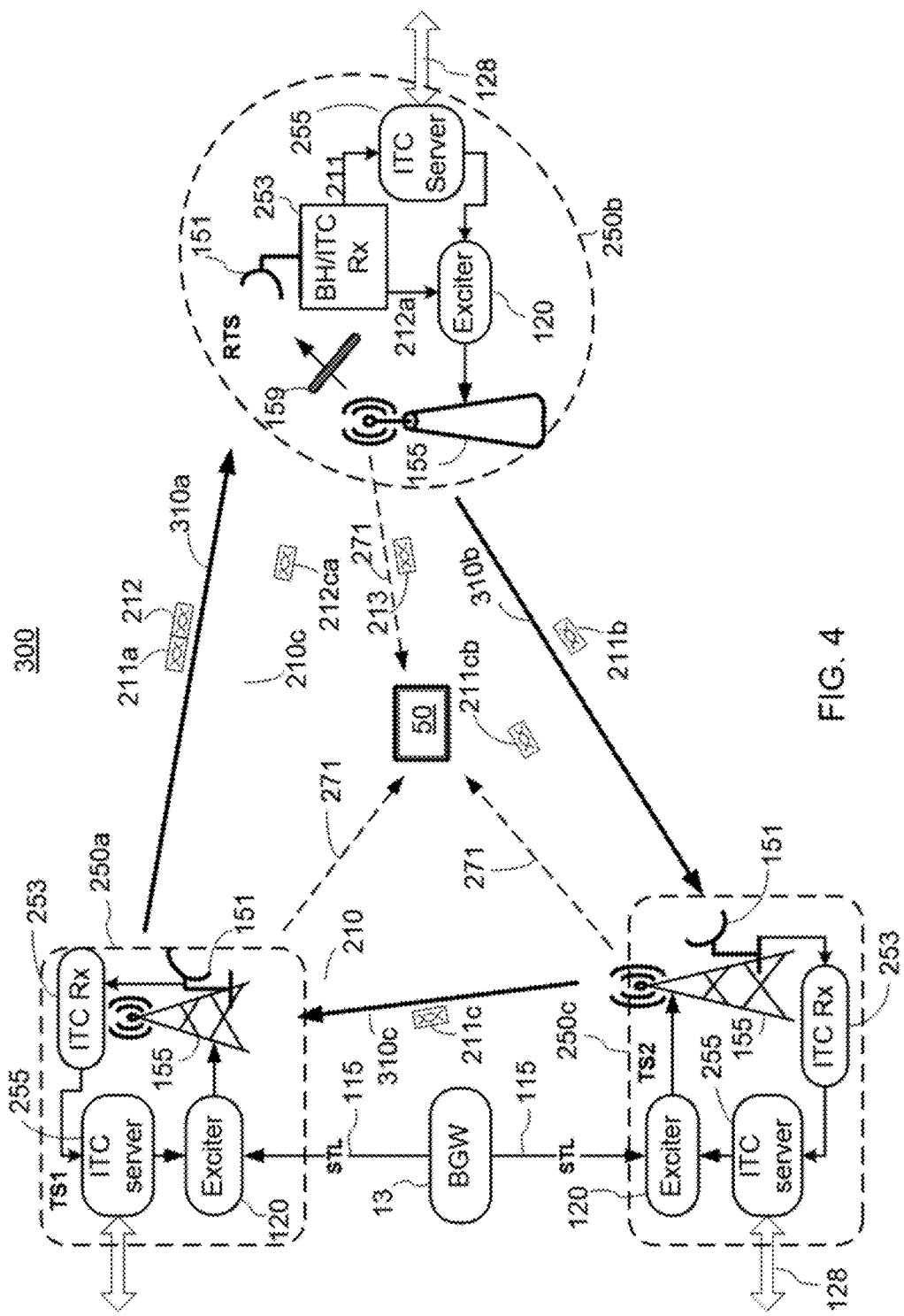
FIG. 4 is a schematic diagram of an example SFN BCS integrating a ring ITC network (ITCN) formed with unidirectional T2T links supporting two-way ITC.

Referring now to FIG. 4, it illustrates an example BCS 300, which is a modification of the BCS 200 wherein three TTS 250a, 250b, and 250c are wirelessly interconnected by a ring ITCN. In this embodiment, each of the TTS 250 shown in the figure includes an ITC Rx 253 with an Rx antenna 151 coupled thereto, and an ITCN server 255 operatively coupled to the ITC Rx 253. Each of the TTSs 250a, 250b, and 250c may be configured to support T2T communication links, e.g., 310a, 310b, or 310c, to two other TTSs, which may be in a LOS therefrom. The T2T communication links 310a, 310b, and 310c may be commonly referred to as T2T links 310.

These T2T links 310 may be unidirectional, wherein each TTS 250 is at a receive end of one T2T link 310 and at a transmit end of another T2T link 310. In some embodiments, each participating TTS 250 may be configured to exchange ITCN messages with any other TTS 250 in the ring, possibly via a third TTS 250 and two or more T2T links 310, thereby enabling bi-directional ITC signalling between any two of the TTS 250.

The Rx antennas 151 of at least one of the TTS 250 may be a directional Rx antenna that is aimed selectively at the Tx antenna of another TTS 250 at the transmit end of the T2T link connecting the two TTS.

For example, in the TTS 250b, the Rx antenna 151 may be a directional Rx antenna aimed generally in a direction of the Tx antenna of TTS 250a, or in a direction of best signal reception therefrom. The Tx portion of TTS 250b may operate as described above with reference to BCS 200, with the Tx antenna 155 transmitting the second Tx signal that includes the ITC signal 211b, and may further include local broadcast/datacast services signals 213.

In the illustrated example the TTS 250c is connected to BGW 13 by an STL link, but may also be configured as an IRBS. The Rx antenna 151 may also be a directional Rx antenna aimed, e.g., generally in a direction of the Tx antenna of TTS 250b. The Rx portion of TTS 250c, e.g., the Rx antenna 151, ITC Rx 253, and parts of the local ITC server 255, may operate generally as described above with reference to corresponding features of TTS 250a, 250b of BCS 200. The Tx portion of TTS 250c may also operate as described above with reference e.g., to corresponding features of TTS 250a of BCS 200, with the Tx antenna 155 of TTS 250c transmitting a third Tx signal that includes broadcast service signal 271 and an ITC signal 211c.

In the TTS 250a, the Rx antenna 151 may also be a directional Rx antenna aimed generally in a direction of the Tx antenna of TTS 250c, and may operate, generally as described above with reference to BCS 200, to extract an ITC signal from a wireless signal received at the Tx antenna thereof, with the extracted ITC signal being the ITC signal 211c transmitted by the MRS 250b.

In some embodiments the Rx antennas 151 of the TTSs 250 may be reconfigurable directional Rx antennas. In some embodiments, they may be dynamically reconfigurable in operation to be aimed in a general direction of another TTS, e.g., to reverse the flow of ITC signals in the ITCN ring.

Figure 5:
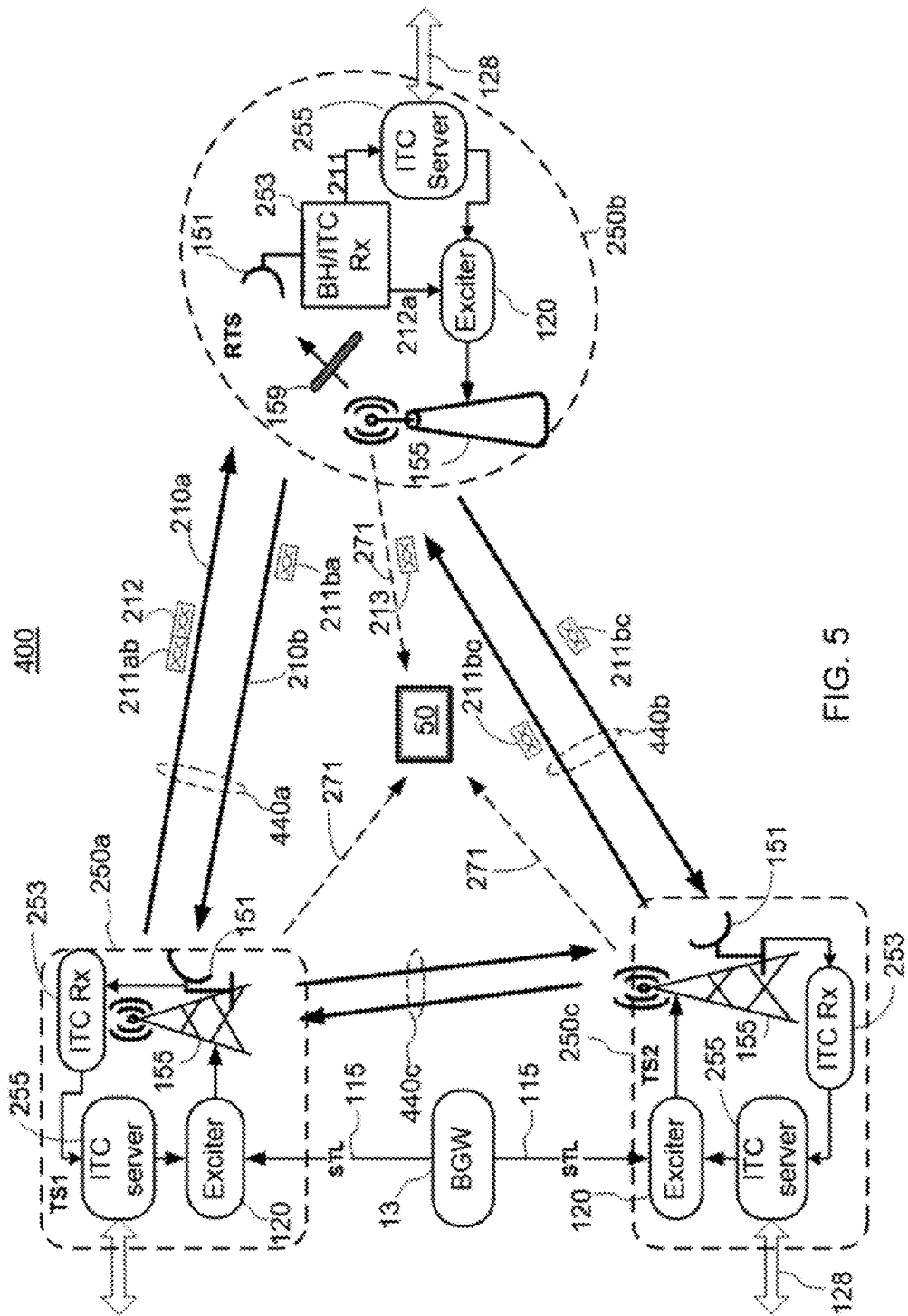
FIG. 5 is a schematic diagram of an example ring ITC network (ITCN) formed with bi-directional T2T links in an SFN BCS.

Referring now to FIG. 5, it illustrates an example BCS 400, which may be an embodiment or a modification of BCS 300 with a bi-directional ring ITCN, so that each participating TTS 250 thereof is wirelessly connected to two other TTS with bi-directional T2T links 440a, 440b, and/or 440c, commonly referred to as T2T links 440. In this example, each TTS 250 may receive wireless Tx signals from two other TTS 250, each including a different ITC signal. In some embodiments, only some of the T2T links 440, e.g., one or two, may be bi-directional, with the remaining T2T links unidirectional as described above.

In some embodiments, the TTSs 250, e.g., the exciters 120 thereof, may be configured to use orthogonal signal multiplexing for the ITC signals from different TTSs, e.g., using TDM, FDM, or spread-spectrum techniques such as CDM/CDMA, to facilitate their separate detection and extraction at the ITC Rx of the receiving TTS.

The transmitter circuitry of, e.g., TTS 250b may be configured to include, in the wireless Tx signal it transmits, ITC signals 211ba and 211bc that are directed to different TTSs, e.g., the first and third TTS 250a, 250c respectively. In some embodiments, these ITC signals 211ba and 211bc may be transmitted in different time periods. In some embodiments, these ITC signals may be transmitted in a same time period using e.g., spread spectrum multiplexing techniques, or FDM techniques, or any combination of TDM, FDM, and spread spectrum multiplexing techniques, such as e.g., CDM/CDMA.

In the example of FIG. 5, the Rx antenna 151 of, e.g., TTS 250b may receive a wireless signal comprising the first Tx signal emitted by TTS 250a and the third Tx signal from TTS 250c. The first Tx signal emitted by TTS 250a may include ITC signal 211ab, while the third Tx signal from TTS 250c may include ITC signal 211cb. The ITC Rx 253 of TTS 250b may be configured to separately detect these ITC signals in an electrical signal from the Rx antenna, and individually pass these ITC signals, or the data they carry, to the local ITCN server 255. In some embodiments, ITCN servers 255 of ITCN-connected TTSs 250 may coordinate their ITC transmissions, e.g., time-multiplex to transmit the ITC signals 211ab and 211cb in different time periods. In some embodiments, a participating TTS may have two or more different directional Rx antennas 151 aimed respectively at two or more TTSs. In some embodiments, the Rx antenna 151 may be dynamically reconfigurable to be aimed in the direction of different TTS 250 at different times.

Figure 6:
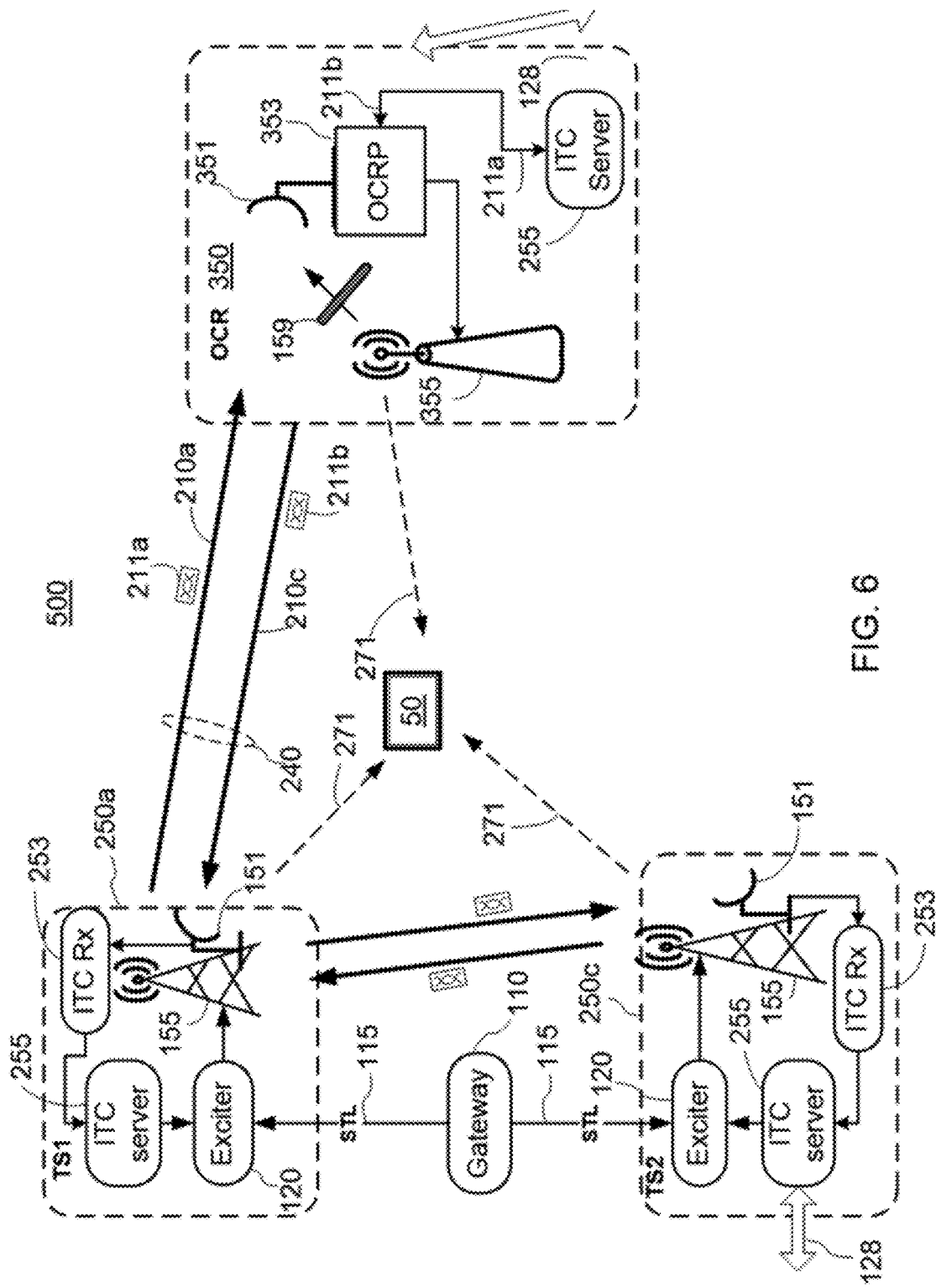
FIG. 6 is a schematic diagram of an example ITCN implemented in an SFN BCS including an on-channel repeater (OCR)

Referring now to FIG. 6, it illustrates an example BCS 500 in which one of participating TTSs comprises an ITCN-enabled OCR. BCS 500 may be a modification of BCS 400 in which an OCR TTS 350 replaces the RTS/IBRS 250b. BCS 500 may be, e.g., a broadcast SFN configured to deliver broadcast service signals 271 to end users 50 in L1 and L2 LDM layers from all three TTS 250a, 250c, 350, or TTS 350 may have a different broadcast area that may at most partially overlap with the broadcast areas of TTSs 250.

The OCR TTS 350, which may be referred to simply as the OCR 350, includes an Rx antenna 351 coupled to an OCR processor (OCRP) 353, which may include an ITC receiver or ITC multiplexer/demultiplexer as described below. OCRP 353 is configured to process a broadcast signal received by the Rx antenna 351, and to pass the processed signal to the Tx antenna 355 for retransmitting. The broadcast signal received by the Rx antenna 351 may include at least the broadcast service signal 271, and possibly an ITC signal 211a, but may be absent of broadcast backhaul carrying signals in at least some embodiments. In some embodiments, the OCRP 353 may be configured to superimpose an outgoing ITC signal 211b upon the processed signal prior to the retransmitting. The outgoing ITC signal 211b may be provided by a local ITCN server 255, e.g., as generally described above and further described below. In some embodiments, the OCRP 353 may be configured to detect an in-coming ITC signal 211a in the received broadcast signal, and to pass the detected in-coming ITC signal to a local ITCN server 255.

In the illustrated embodiment, the Rx antenna 351 of OCR 350 is configured to receive wireless signals from the TTS 250a, which carries both the broadcast service signal 271 and the ITC signal 211a, while the Rx antenna 151 of the TTS 250a is configured to receive wireless signals from the OCR 350, so that a bi-directional T2T link 240 between the two TTS may be established. The TTS 250a may further be configured to establish a second bi-directional T2T link to the TTS 250c, e.g., as described above with reference to BCS 400, thereby enabling two-way ITCN communications between any two of the shown TTS of BCS 500. In some embodiments, ITC signals 220b transmitted by the OCR 350 may be picked up and processed by the third TTS 250c, supporting uni-directional or bi-directional T2T links between the OCR 350 and each of the two TTS 250.

The Rx antenna 351 may be a directional high-gain antenna that may be installed at a high location to achieve a suitable signal reception from the TTS 250a or TTS 250b, ideally via a LOS channel. Since the Rx antenna 351 of the OCR TTS 350 may be located close to the Tx antenna 355 thereof, a shield 159 may be used to at least partially supress the loopback signal from the Tx to the Rx antennas of the OCR TTS 350, to prevent the transmission signal of the OCR from interfering with the received signal detection. The OCR 350 may simply pick up the over-the-air signal, and use OCRP 353 to perform signal processing in the analog and/or digital domain to eliminate multipath distortion and the loopback signal from the retransmission. In some embodiment, the OCR 350 may receive incoming ITC signals from two or more different TTS, which may be transmitted in different time intervals.

The OCRP 353 may be configured to add outgoing ITC signals 211*b* to the processed signal as the third LDM (L3) layer. The OCRP 353 may also be configured to read incoming ITC signals 211*a* from the received signal, either prior or after the processing. In some embodiment, the incoming and outgoing ITC signals may be transmitted in the L3 layer in different time intervals, e.g., in a half-duplex mode. In some embodiments the OCR may perform a full-duplex ITC transmission in L3. In such implementations an OCR may superimpose outgoing ITC signals over the received and processed broadcast signal without first removing incoming L3 signals therefrom. The outgoing ITC signals may be encoded using robust encoding and/or modulation techniques, e.g., with SNR threshold that may be set at a negative dB number, e.g., −3 dB.

Figure 7:
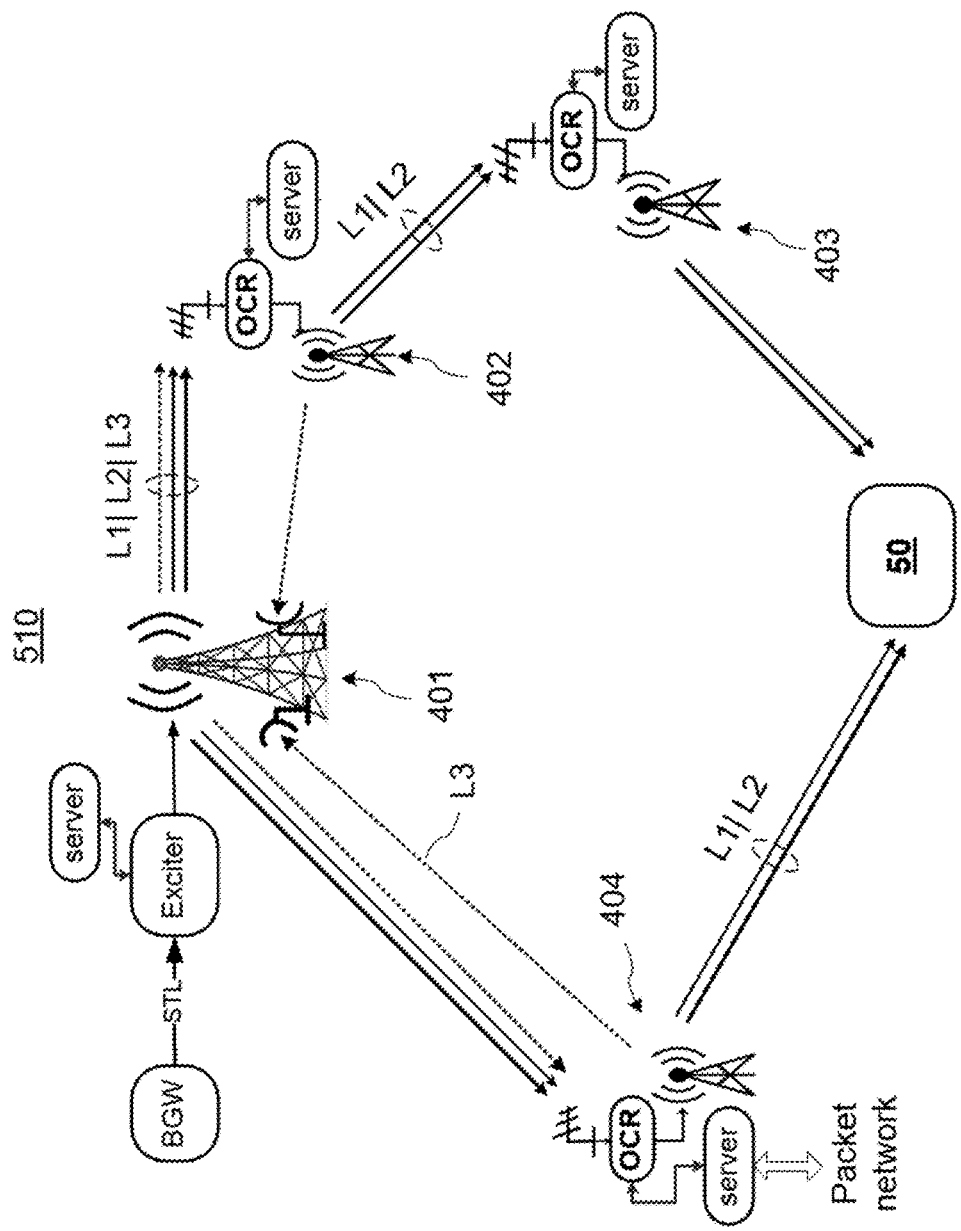
FIG. 7 is a schematic diagram of an example ITCN implemented in an SFN BCS with three OCR relays.

FIG. 7 illustrates an example implementation of an ITCN in a BCS 510 including a multi-hop OCR relay. BCS 510 may be, for example, an LDM-based SFN configured to operate in accordance with the ATSC 3.0 standards. In the illustrated example, BCS 510 includes a primary TTS 401 and three OCR TTSs 402, 403, and 404, with the OCR TTSs 402 and 403 forming a two-hop OCR relay. In this example, a wireless Tx signal from TTS 401 is received by TTS 402 and TTS 404, which then re-transmit them as described above, to provide broadcast service to end-users. The signal re-transmitted by the TTS 402 may in turn be received, processed, and again re-transmitted by the TTS 403 for end users 50 in its local service area. The end users 50 may receive broadcast service signals from some or all of the TTSs 401-404, possibly depending on the location. The broadcast service signals are indicated by the thin and thick solid arrows, which may represent, e.g., LDM signals of the L1 and L2 layers. The wireless Tx signal transmitted by the primary TTS 401 may also include ITC signals, indicates by the dotted arrows, intended for the TTSs 403 and 401. Each of the OCR TTS 402 and 404 may also be configured to include an ITC signal in the wireless Tx signal they transmit, e.g., by superimposing it as a third LDM layer (L3) upon the Tx signal to be retransmitted. The primary TTS 401 may include two directional Rx antennas, aimed respectively at the TTS 402 and TTS 404, to receive the Tx signals from which the corresponding in-coming ITC signals may be extracted. Each of the shown TTS may include an ITCN server as described above, which may connect to an external packet network.

Figure 8:
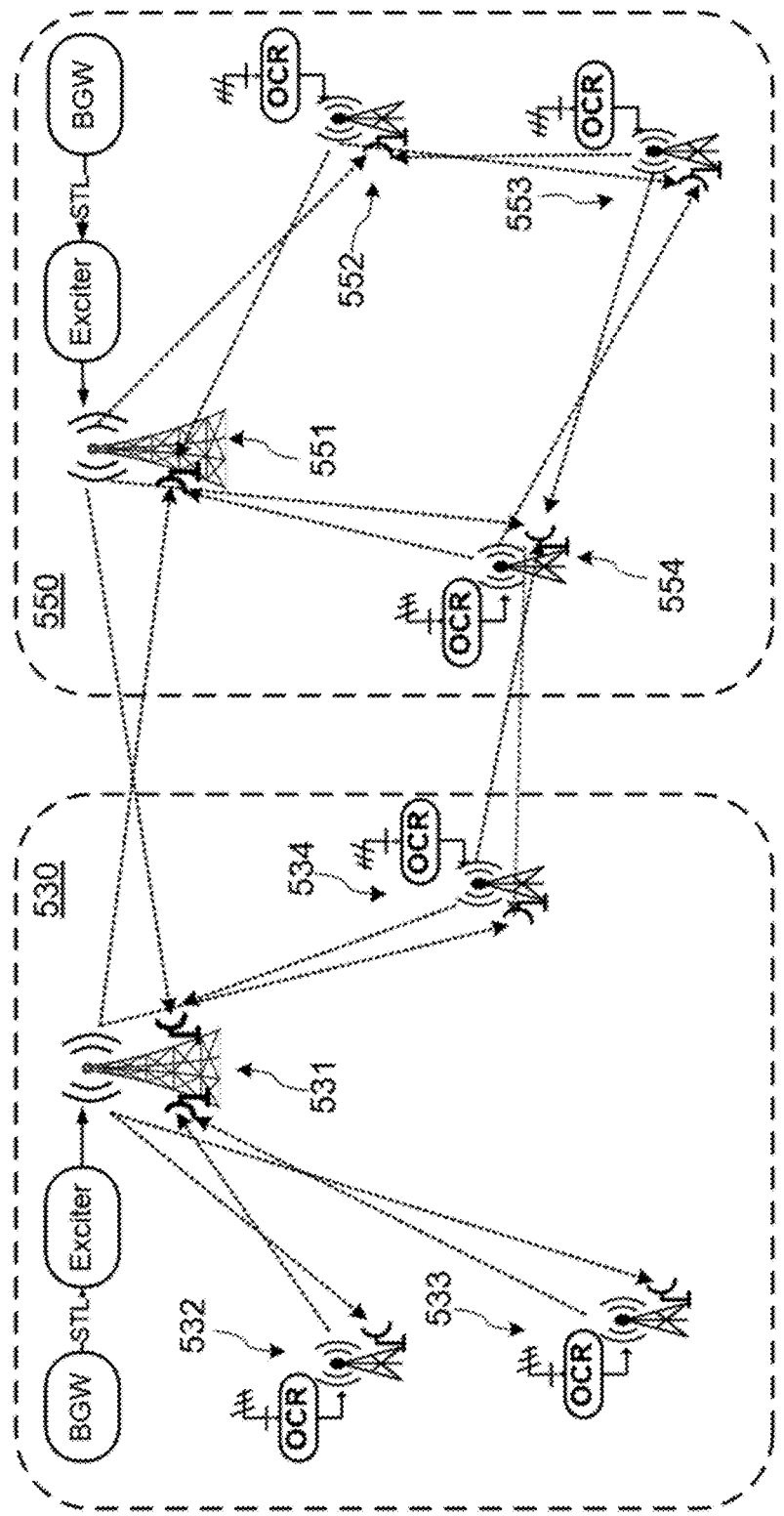
FIG. 8 is a schematic diagram illustrating two SFN BCSs having interconnected ITCNs to form a wide-area integrated inter-tower wireless network (IITWN) with a gateway to an external packet network.

With reference to FIG. 8, ITCNs of two or more BCSs may be interconnected to form an integrated inter-tower wireless network (IITWN). In the illustrated example, BCSs 530 and 550 are two different broadcast SFNs, each including a primary TTS and three OCR TTSs that relay broadcast signals from the primary TTS. One or more of the OCR relays in each BCS can be replaced by non-OCR TTSs using in-band backhaul delivery, STL, or other backhaul delivery methods. The two BCSs 530 and 550 may operate generally independently, e.g., serving different geographical areas. BCSs 530 and 550 may operate on a same carrier frequency or different carrier frequencies, e.g., in non-overlapping frequency bands. In each BCS, ITCN services between the transmit towers may be provided by in-band ITC signals, e.g., within an L2 LDM layer, or an L3 LDM layer. Each transmitter site can have a local ITCN server that may store data for transmitter and network control and local datacasting. The T2T communication links within each BCS, schematically illustrated in FIG. 8 with dotted arrows, may be organized in a star-type configuration, a ring configuration, or a combination thereof. In the illustrated example, the TTSs 531-534 of the BCS 530 are interconnected in a star-type network, e.g., both for broadcast relay and ITC signalling. The TTSs 551-554 of the BCS 550 form a ring-type network, with a multi-hop OCR relay. Each of the shown TTSs may include a local ITCN server (not shown) as described above and below. At least some of these local ITCN servers may have a packet network interface and/or connect to a packet network gateway.

The network topology of each BCS 530, 550 may be reconfigurable and scalable, e.g., when one of the TTSs fails, the ITC signalling may be re-routed to reach other towers. The re-routing may be facilitated by the use of dynamically reconfigurable Rx antennas, such as for example reconfigurable antenna arrays, which may be aimed selectively at any one of two or more different TTSs. To limit the co-channel interference during an ITCN transmission period, multiple Rx antennas with different directivities may be used for over the air ITC signal reception. e.g., in some embodiments TTS 531 of BCS 530 may use two or three different Rx antennas to receive OTA signals from the three TTSs 532, 533, and 534. The ITCNs of the two BCS 530 and 531 may be interconnected by establishing a T2T communication link between a TTS of BCS 530 and a TTS of BCS 550, preferably in a LOS from each other. In the illustrated embodiment, primary TTSs 531 and 551 are at locations where they can receive each other transmission signals, and have their Rx antennas configured for establishing a bi-directional T2T link between the two TTSs. In some embodiments the BCSs 530 and 550 operate at different carrier frequencies, and the TTS 531 and 551 may each combine an in-band ITC signal transmission with an out-of-band ITC signal reception when communicating with each other. The out of band reception of ITC signals from another BCS may simplify the separation of those signals from in-band ITC signals received from a TTS of the same BCS. For example, ITC signals received by the TTS 531 from the TTS 551 may be in a different frequency band than the ITC signals received from TTS 534, which may simplify their separation by the ITC receiver at the TTS 531. In some embodiment, a T2T link may also be established between two OCR relays of the respective BCSs located in a relative vicinity from each other, e.g., between OCR TTSs 534 and 554. Each of the TTS 531-534 and 551-554 may include an ITCN server as described above.

Figure 9:
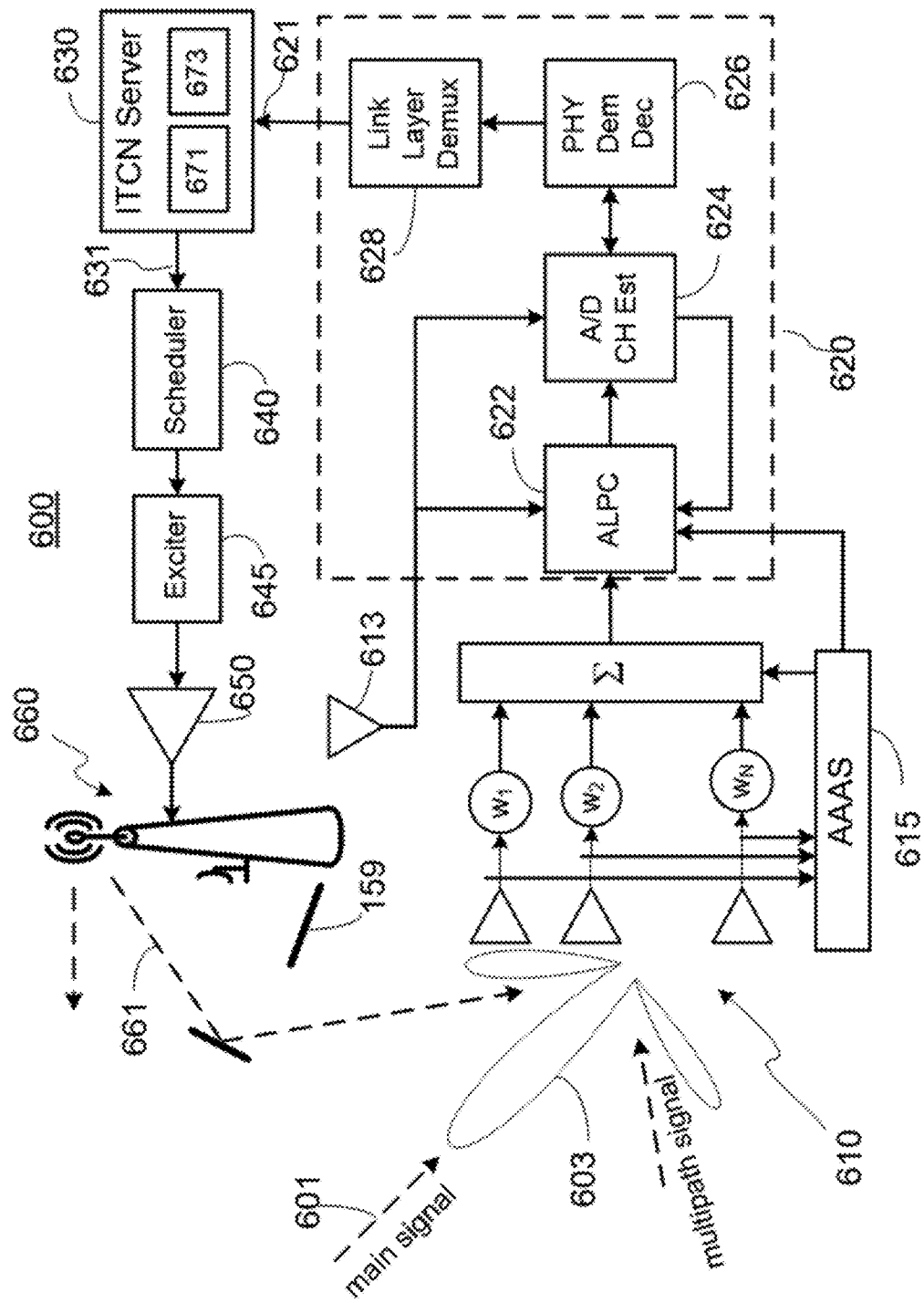
FIG. 9 is a schematic functional block diagram of an ITCN node including an ITCN server.

FIG. 9 schematically illustrates an example ITCN node 600, which may be implemented e.g., at a primary broadcast TTS or at an MRS. It may include an Rx antenna 610, which is operatively followed by an Rx signal processor 620, which in turn connects to an ITCN server 630. The ITCN server includes non-transitory data storage 671 for storing locally sourced and ITCN-received data, and at least one hardware processor 673 operatively coupled thereto and configured to support at least some of: datacasting, a data carousel, backhaul data storage and processing, ITCN management, a packet network interface, and packet traffic routing. Output signals from the ITCN server 630 may include broadcast service signals, datacasting signals, and ITC signals for point-to-point reception by another TTS. The output signals from the ITCN server 630, which may be, e.g., in the form of one or more IP packet streams, are provided to a scheduler 640 that is followed by an exciter 645. The scheduler 640 is configured to convert the IP streams into a format suitable for the exciter 645, schedule the OTA transmission of various services, and interface with the broadcast physical layer of the exciter, which performs signal framing, encoding, multiplexing, and modulation onto an RF carrier. Scheduler 640 may be implemented in software and may be a part of ITCN server 630, but may also be based on a separate hardware processor. The output signals from the exciter 645 are amplified by an output amplifier 650, and sent to a Tx antenna 660 for OTA broadcasting.

The Rx antenna 610 may be either a fixed directional antenna or a reconfigurable adaptive antenna. In the illustrated embodiment the Rx antenna 610 is implemented as an adaptive phase antenna array, which can be configured to align the main lobe of its reception diagram 603 in the direction of a desired Tx broadcast signal 601. An antenna array adaptive system (AAAS) block 615 may be used to configure the Rx antenna 610 to position side lobe nulls of its reception diagram to reduce multipath distortion of the desired signal, and to reduce the loopback signal 661 from the Tx antenna 660 and its multipath reflections from nearby structures. The AAAS block 615 may implement e.g., various machine learning and neural network algorithms, or other artificial intelligence (AI) algorithms, to optimize the antenna array reception pattern by controlling each antenna elements' signal amplitude and phase using RF amplitude/ phase weight elements $w_1, w_2, \ldots w_N$. These elements may also perform RF filtering to reduce the adjacent channel interferences from other broadcast RF signals.

In the Rx signal processor 620, the output signal from the Rx antenna 610 is fed to an analog loopback signal pre-cancellation (ALPC) module 622, which may use an analog feedback signal from the Tx antenna 660 to at least partially cancel the Tx loopback signal from the Rx antenna output. The analog feedback signal may be measured e.g., by a suitably located loopback monitoring antenna 613. ALPC module 622 may also reduce the signal dynamic range. At modules 624 and 626, an analog RF signal output from the ALPC 622 may be down converted, digitized, and converted to baseband for physical (PHY) layer processing, i.e., synchronization, channel estimation, further cancellation of loopback signal, LDM demultiplexing, demodulation and decoding. The LDM demultiplexing, demodulation and decoding may be performed, for example, by the PHY processing block 626, e.g., using known in the art techniques. The feedback signal from the loopback monitor 613, converted to baseband, may be used to further reduce or cancel the loopback signal. Output signal from the PHY processing block 626 may be provided to a Link Layer processing/demultiplexing module 628, which extracts an incoming ITC signal 621 therefrom. The incoming ITC signal 621 is then passed, in the form of stream(s) of data packets, e.g., Internet Protocol (IP) packets, to a local ITCN server 630 for processing, storing therein, passing as data egress to an external packet network, or including into an outgoing ITC signal, to be transmitted with the broadcast service signal over the air to a next TTS/ITCN node and, possibly, local subscribers.

Figure 10:
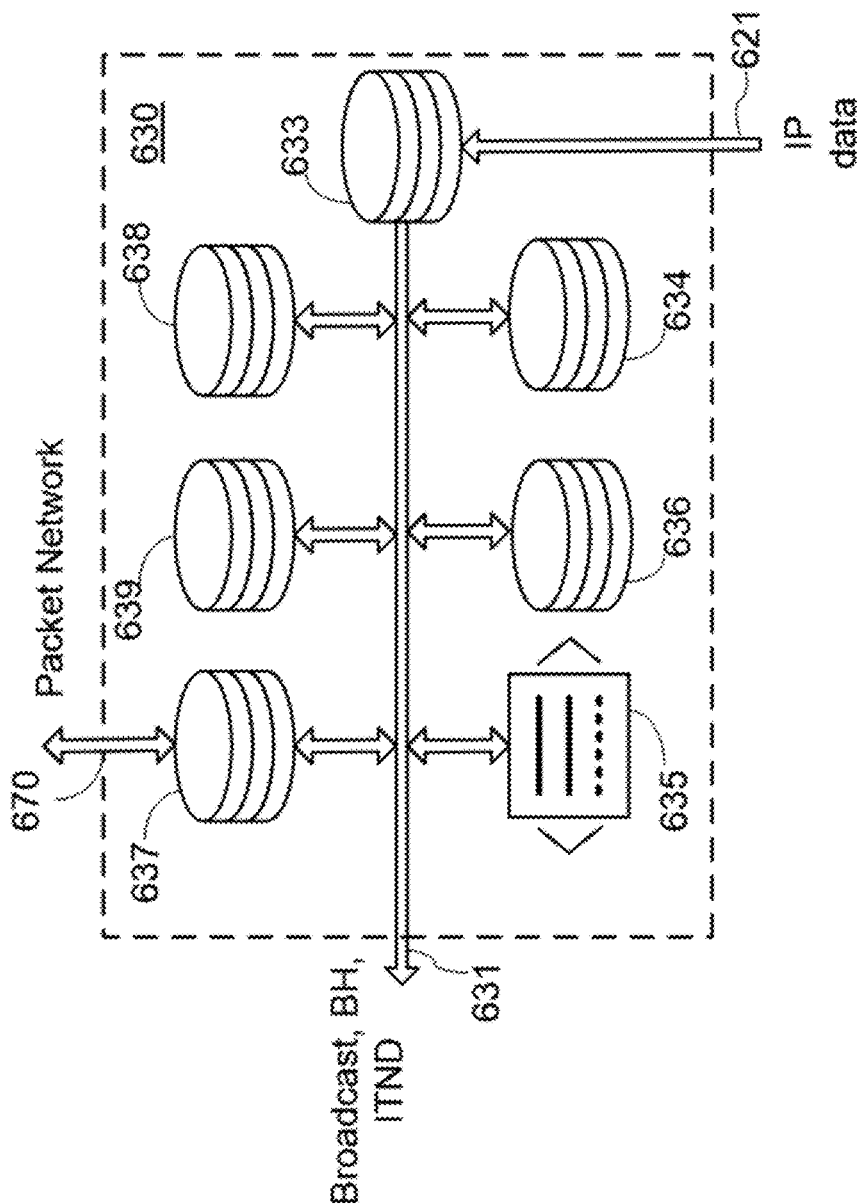
FIG. 10 is a schematic functional block diagram of an ITCN server.

With reference to FIG. 10, the ITCN server 630 may store and control local broadcast programs, backhaul and ITCN data for relay to next node(s), datacasting data, local data and other control data. It can also connect to a local gateway to one or more external packet networks, e.g., the internet, and/or a broadcast core network, which may include one or more content provider studios and/or data providers. The ITCN server 630 may package some combination of these data into an outgoing broadcast signal 631. The outgoing broadcast signal 631 may comprise some combination of broadcast service signals, backhaul carrying signals for a relay TTS, ITC signals for relaying to another TTS, and may also include local broadcast signals carrying datacasting and other data for local subscribers of corresponding OTA datacasting services. ITC signals may also include signals carrying data ingress from an external packet network, including IP traffic. Examples of OTA datacasting, which takes advantage of the one-to-many distribution capacity of OTA broadcasting, may include OTA delivery of software upgrades, local emergency alerts, weather updates, local news, etc. This outgoing broadcast signal 631 is then provided to the scheduler 640 and the exciter 645 to generate the RF broadcast signal waveform.

The ITCN server 630 may include a controller module 633, and one or more data storage modules, such as data storage modules for storing broadcast programs and broadcast control 634, datacasting data 636, backhaul and/or ITCN data for relay to next node(s) of the ITCN 638, network control data 639, local data 637, or some combination thereof. Network control data may include ITCN management data, e.g., data indicating transmitter status for various TTSs in the ITCN, ITC data flow between TTSs, Tx/Rx health data, network operation and maintenance data, network IDs for the participating TTSs and/or the corresponding ITCN servers. A network interface 670 to an external packet network may be provided, e.g., as a gateway for IP or other packet data ingress and egress. The network interface 670 may be used, e.g., to connect to the Internet, and/or a broadcast core network to receive TV and/or audio broadcast signals, and/or various data for localized datacasting services. Data ingress received via interface 670 may be stored, e.g., temporarily, at the data storage 637. In some embodiments server 630 may include a data carousel module 635 to support a data carousel service for local broadcast subscribers. The controller 633 may control the flow of data and messages in the ITCN server ("broadcast node"), provide control information for scheduler 640, LDM and other physical layer functions at the exciter 645, and may also communicate with other broadcast nodes in the ITCN or IITWCN by exchanging IP messages over two-way ITC signalling, as well as internetwork with other IP networks via the packet network interface 670. In an example embodiment, the controller 633 may receive, via the packet network interface 670, incoming IP traffic from one or more broadcast facilities, e.g., one or more broadcast studios and/or data centers, from other TTSs within a same IITWN, or from other IP networks. The controller 633 may then schedule the transmission of various received data depending on the usage and network conditions. The controller 633 may also re-direct the transmission of the received data depending on the usage and network conditions. The controller 633 may read and modify IP headers to route corresponding packets along a selected route in the IITWN. The controller 633 may direct IP packets carrying corresponding data to be stored in one of the data stores 634-638.

ITCN servers located at different TTSs may be assigned different network addresses. The controller 633 may examine incoming packet streams and write a network address of another TTS in its header, e.g., as a destination network address or an intermediate network address next in a selected route.

The controller 633 may communicate with other ITCN servers in the ITCN or IITWN to monitor network conditions and to route and manage the IP traffic between TTSs of the ITCN or IITWN. In some embodiments, the controller 633 may communicate with the antenna 610 to control the reception direction, and may change its directivity to receive OTA broadcast signals from a different TTS, to re-direct ITC traffic in the IITWN.

In some embodiments, node 600 may include two or more Rx antennas, each followed by a different instance of the Rx signal processor 620, or a version thereof, to separately detect ITC signals from two or more different TTSs. These ITC signals may then be independently fed to the ITCN controller 630 for processing.

FIG. 9 illustrates an ITCN node 600 configured for in-band ITCN and, in some embodiments, backhaul signal reception and transmission. Such a node may be implemented, e.g., at TTS 250a, TTS 250b, and TTS 401 described above with reference to FIGS. 3-6. In embodiments with an out of band reception of ITC signals, such as e.g., at TTS 531 and 551, the loopback monitor 613 and loopback cancellation functions of modules 622, 624, 613 may be omitted, and replaced with a down-converting ADC (analog to digital converter).

Figure 11:
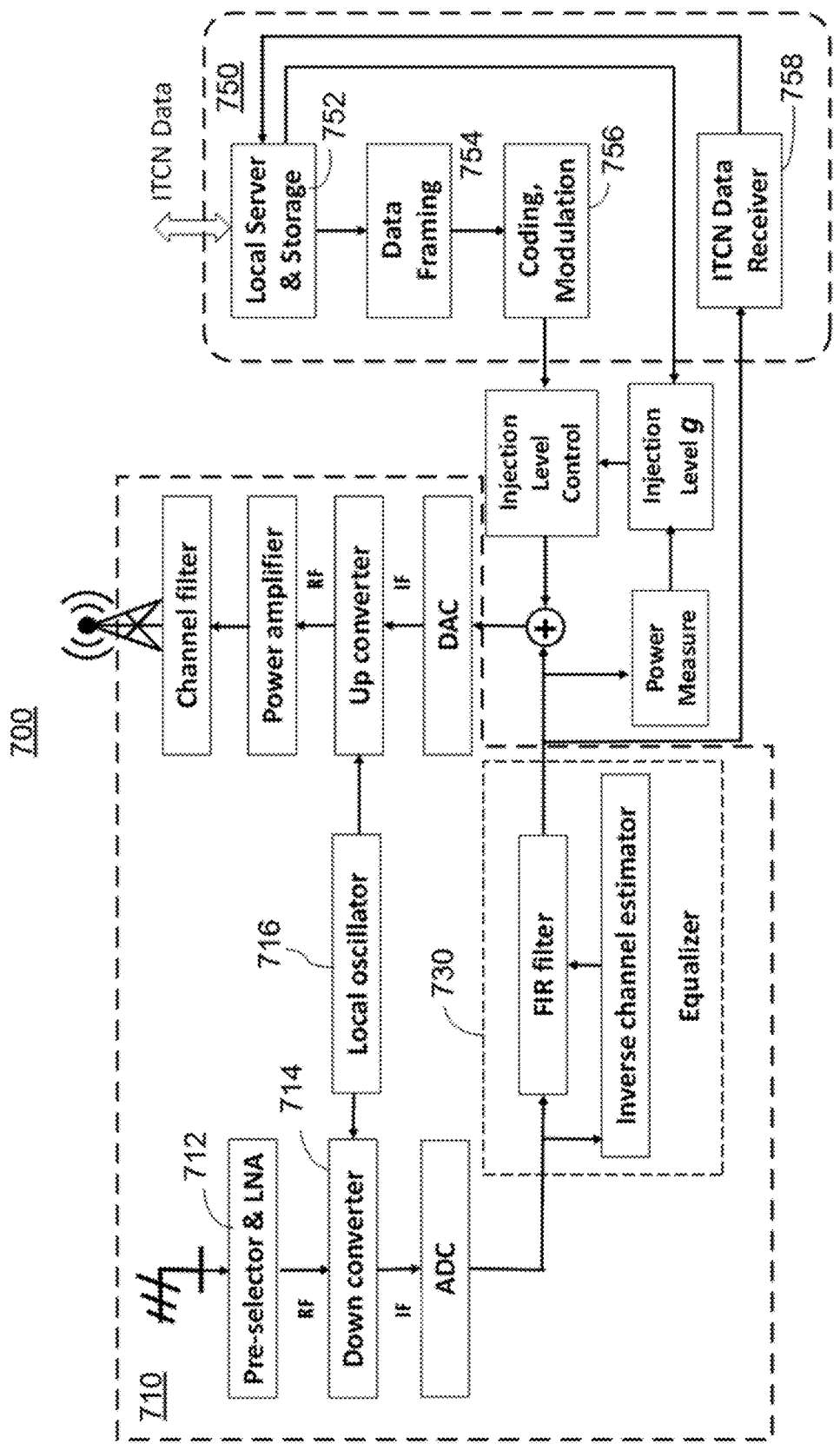
FIG. 11 is schematic functional block diagram of an OCR signal processor.

FIG. 11 shows functional blocks of an example OCR configured for ITC signal injection, e.g., as an added LDM layer. It includes a signal amplification and equalization (SAE) portion 710, and an ITC signal addition/extraction portion 750. In the SAE portion 710, an RF signal from an Rx antenna is passed to a low-noise amplifier (LNA) 712 which may include a band-pass filter at its input. An RF output of LNA 712 is passed to a downconverter 714, which down—converts it to an intermediate frequency (IF) signal. The same local oscillator 716 can be used to up-convert a processed IF signal for transmission to maintain the synchronization between the transmitted and received signals. In some embodiments, the down-converted IF signal may be digitized by an ADC and passed to a digital equalizer 730, which in some embodiments may include, e.g., a finite response filter (FIR) and an inverse channel equalizer. An equalized digital signal from the output of equalizer 730 may be converted back to an analog IF signal by a digital to analog converter (DAC), up-converted to a carrier frequency, and, after passing through a power amplifier and a channel filter, provided to a Tx antenna for broadcasting over the air.

The ITCN data addition and detection portion 750 of the OCR 700 may include an ITCN server 752 a data framing module 754, a coding and modulation module 756, and may include an Rx signal processor 758. The data framing module 754 and the coding and modulation module 756 may perform one or more functions described above with reference to the scheduler 640 and the exciter 645. The ITCN server 752 may be an embodiment of the ITCN server 630 described above. It may include a local data server, controller, and storage module 752. The ITCN server 752 may have an interface to an external packet network, and may be configured to collect and pre-package outgoing ITCN data, which may include locally stored data and local ingress data packets from the external packet network, e.g., IP messaging and data traffic. The outgoing ITCN data are then framed, coded, modulated onto the IF, and then superimposed as an outgoing ITC signal onto the equalized received signal, e.g., as an additional LDM layer, prior to converting the resulting signal back to the analog domain.

In some embodiments, a copy of the received signal from the output of equalizer 730 may be provided to the Rx signal processor 758 for detecting an incoming ITC signal. The Rx signal processor 758 may perform one or more functions of the Rx signal processor 620, including the detection of incoming ITC signals, de-multiplexing, and decoding the detected ITC signals to obtain streams of data packets. The detection of the incoming ITC signal may include, for example, the detection and demodulation of the top LDM layer of the equalized received signal, which may be for example the L3 LDM layer.

The ITC signal reception and addition circuit 750 of OCR 700 may be configured for half-duplex or full-duplex operation. In a half-duplex scheme, based on time-domain interlacing of incoming and outgoing ITC signals, the ITCN server 752, in coordination with other ITCN servers in the network, may implement a smart traffic management function to control the timing of outgoing ITC transmission, to transmit in a time frame absent of incoming ITC signal. Some implementations may use a full duplex ITC transmission in L3, which may be combined with robust coding and modulation at blocks 754 and 765, with SNR threshold that may be set at a negative dB value, e.g., −3dB. In such implementations the outgoing ITC signals may be superimposed over the received and processed broadcast signal without first removing incoming L3 signals therefrom.

FIGS. 12A and 12B schematically illustrate example signal blocks of a broadcast transmission signal carrying ITC signals and, optionally, local datacasting signals, in the L2 LDM layer. Such signals may be transmitted over the air, for example, by the TTS 250b, 250c in the BCSs of FIGS. 3-5, TTS by 250a, 250c in the BCS 500 of FIG. 6, and by a primary TTS in an OCR-based BCS, e.g., as illustrated in FIGS. 7 and 8, or generally by any TTS communicating with another TTS having a receiver capable for LDM demultiplexing. Although ITC signals may be carried in any LDM layer, incorporating them in the L2 layer may be preferable, since the L2 signals are usually configured to have a much higher throughput than the L1 signals, so that delivering the ITC and related signals takes a smaller portion of the L2 signal capacity.

Figure 12:
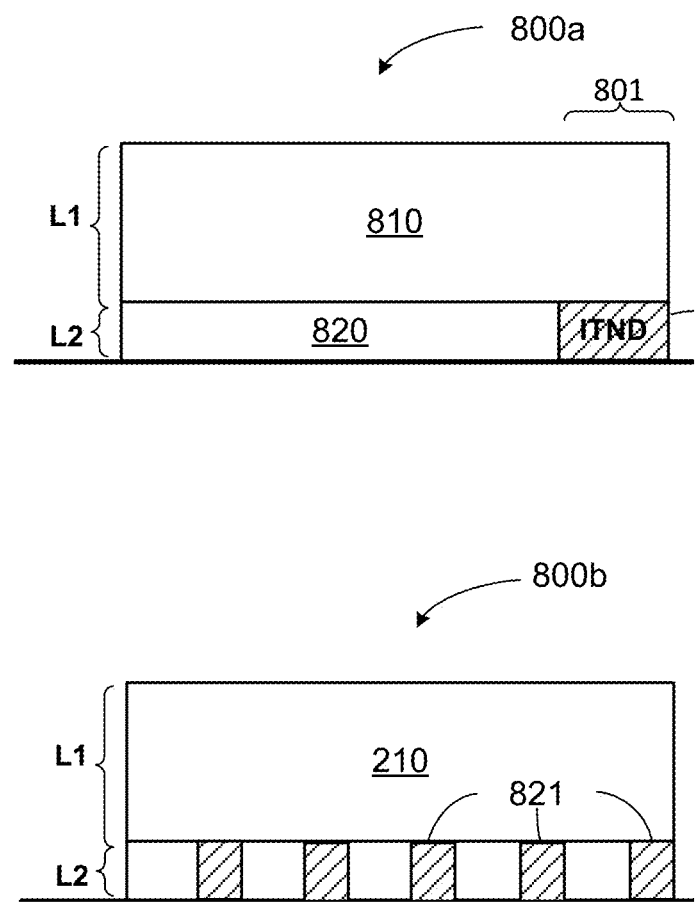
FIG. 12 is a schematic diagram illustrating 2-Layer LDM Signal Structure with inter-tower network and datacasting (ITND) services in L2 layer.

FIG. 12 illustrates example signal blocks 800a and 800b of a SFN LDM transmission signal carrying first broadcast service signals 810 in the L1 layer, and second broadcast service signals 820 in the L2 layer. The L2 layer also carries ITC signals 821 and and/or datacasting signals, and/or other signals targeted to a local broadcast area of the transmitting TTS, which are collectively termed ITND signals. ITND signals being carried in the L2 layer may satisfy a broad standard applicable in the local reception area, e.g., ATSC 3.0 standards, and may thus be recognized by end-user equipment.

In the signal block 800a, the ITND signal is transmitted within one time-frequency resource block, e.g., one Physical Layer Pipe (PLP). This may correspond to ITND signals 821 being transmitted in a transition time period 801, time-multiplexed with the second broadcast service signals 820. The transmission time period 801, termed ITC period, may be dedicated to ITC transmission by a given ITCN, and may be known to all TTSs connected by the ITCN. In Error! Reference source not found.the signal block 800b, the ITND signal is transmitted in multiple PLPs, or time-frequency resource blocks. The ITND transmission using signal blocks 800b may be more robust due to better time-frequency diversity. In some embodiments, different PLPs or ITC periods may be used for delivering L2-layer ITC signals addressed to different TTSs.

Figure 13:
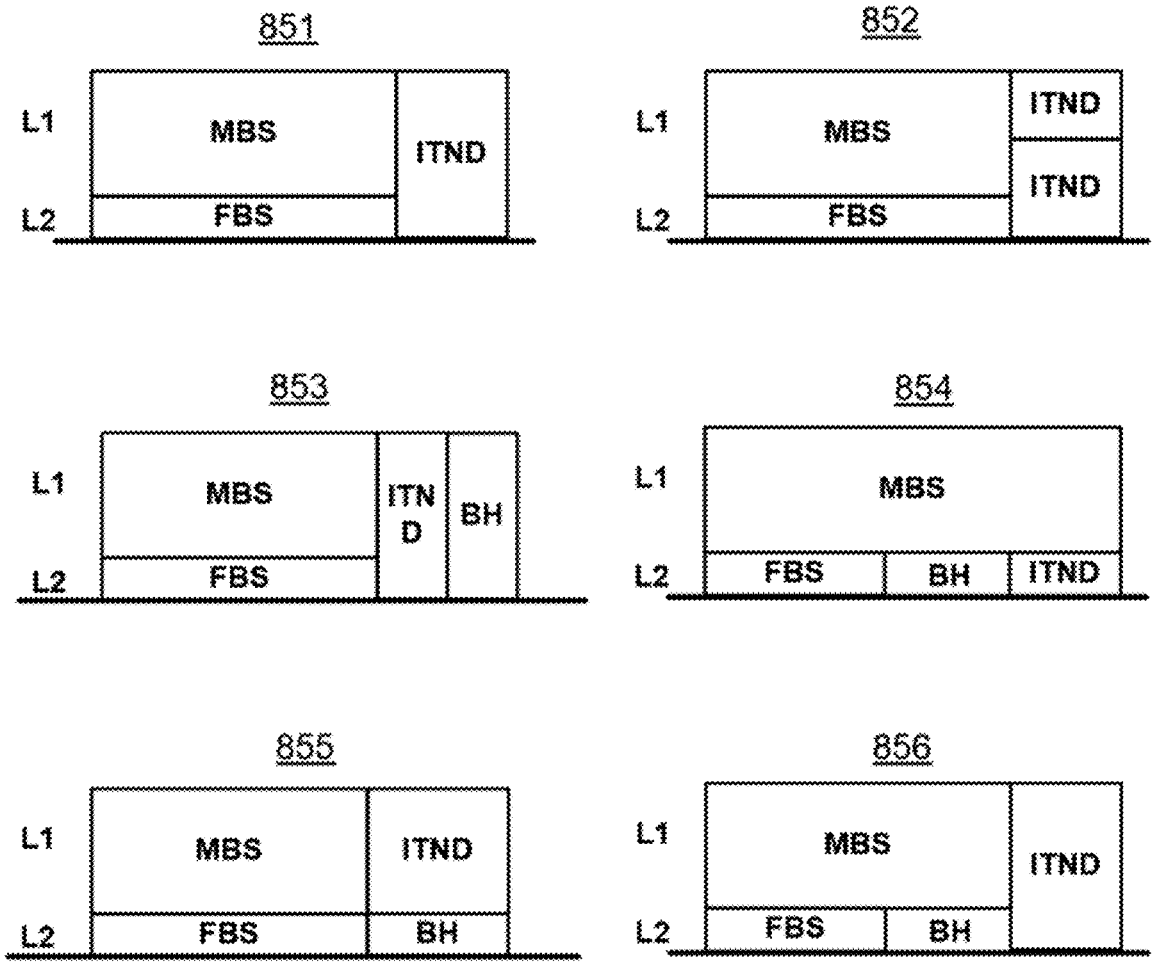
FIG. 13 is a schematic diagram illustrating example 2-Layer LDM signal blocks for delivering mobile, fixed, backhaul, and ITND services.

FIG. 13 illustrates some examples of layered signal structures for delivering combined mobile, fixed, backhaul, and ITND services in 2-layer LDM systems. There are three different services illustrated: i) SFN or non-SFN broadcasting services to mobile/fixed terminals using LDM, which are indicated as MBS (mobile broadcast service) and FBS (fixed broadcast service); ii) SFN backhaul (BH), which may be a one-way high data rate service delivered at a high signal to noise ratio (SNR) for spectrum efficiency, and iii) ITND services, which may include two-way ITC communications and LDM datacasting in each or some tower coverage area, while different towers may be transmitting different ITND data. Inter-tower networking can operate as a SFN or as a non-SFN multi-frequency network. These three services can be TDM, FDM or LDM multiplexed depending on application scenarios for efficient use of spectrum.

In the examples of FIG. 13, a Tx signal block 851 implements TDM multiplexing of single-layer ITND signals with MBS and FBS signals, which are transmitted in LDM layers L1 and L2, respectively. A Tx signal block 852 implements TDM multiplexing of two-layer ITND signals with two-layer MBS/FBS signals. A Tx signal block 853 implements TDM multiplexing of single-layer ITND signals, single-layer BH signals, and two-layer broadcast service signals, with the MBS and FBS signals transmitted in LDM layers L1 and L2, respectively. A Tx signal block 854 carries FBS signals, ITND signals, and FBS signals in different PLPs of the L2 layer, e.g., using TDM multiplexing, FDM multiplexing, or CDMA multiplexing, with the MBS signals delivered in the L1 layer. A Tx signal block 855 carries MBS and ITND signals in different PLPs in the L1 layer, and FBS and BH signals in different PLPs of the L2 layer. The Tx signal block 855 may also represent TDM multiplexing of a two-layer broadcast services signal, having the MBS and FBS in different layers, with a two-layer ITND/BH signals having the BH and ITND signals in different layers. A Tx signal block 856 is a variation of the Tx signal block 851, wherein the L2 layer signals include BH signals in one or more PLPs thereof.

Signal blocks 853-856 may be used, for example, by primary TTS delivering in-band or out-of-band backhaul to an IBRS, e.g., as described above with reference to FIGS. 3-5. Signal blocks 851, 852 may be used e.g., by any TTS not delivering an in-band backhaul.

Figures 14, 15:
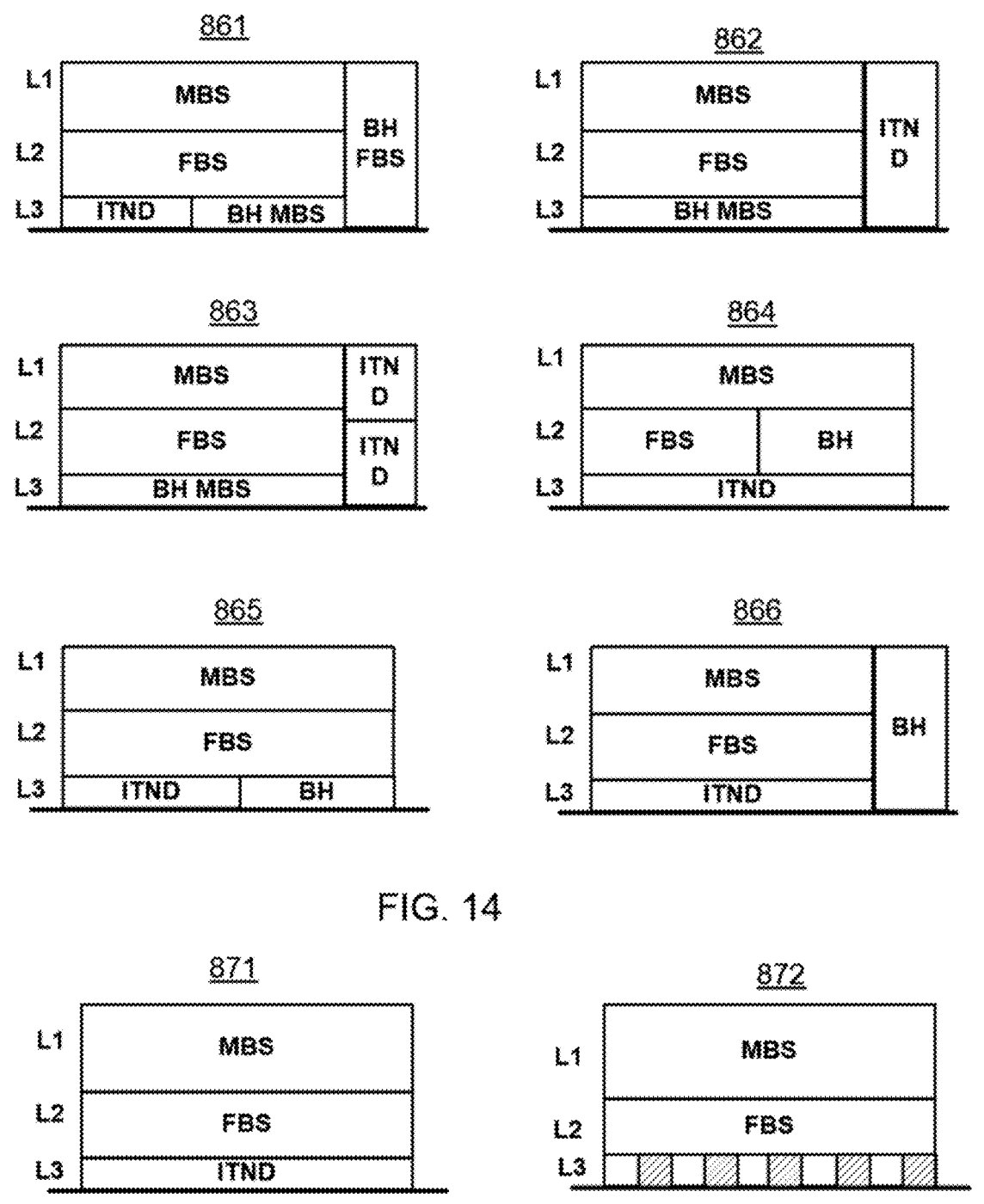

FIG. 14 illustrates some examples of layered signal structures for delivering combined MBS, FBS, backhaul, and ITND services in three-layer LDM systems using LDM, TDM, and FDM multiplexing in different combinations. Here, "BH FBS" stands for FBS backhaul, i.e. backhaul information for FBS services, and "BH MBS" stands for MBS backhaul, i.e. backhaul information for MBS services. Signal block 861 carries BH FBS signals in a single-layer, TDM multiplexed with a three-layer LDM block having ITND and BH MBS signals multiplexed in the L3 layer. Signal blocks 862 carries ITND signals in a single-layer, TDM multiplexed with a three-layer LDM block having BH MBS signals in the L3 layer. Signal block 863 carries ITND signals in a two-layer block, TDM multiplexed with a three-layer LDM block having BH MBS signals in the L3 layer. Signal block 864 is a three-layer LDM signal block, having ITND signals in L3, and FBS and BH signals multiplexed in L2. Signal block 865 is a three-layer LDM signal block, having ITND signals and BH signals multiplexed in L3. Signal block 866 is a three-layer LDM signal block, having ITND signals in one or more PLPs of L3 layer, and a time-multiplexed BH signal.

FIG. 15 illustrates example signal structures 871, 872 of a three-layer LDM for delivering ITND services in a third LDM layer, which may be used e.g., in an ITCN using one or more OCRs. In some embodiments ITND service delivery in L3 layer may operate in a full-duplex mode, as illustrated by a signal block 871. An OCR may superimpose outgoing ITC signals over a received and processed signal carrying incoming ITC signals in a same time frame, e.g., using robust coding and modulation with a negative dB threshold for the outgoing ITC signal. In some embodiments ITC signals can be time-frame interlaced in L3 for 2-way ITC networking in a half-duplex mode, rather than full duplex mode in other embodiments, e.g., as illustrated at 872. The times at which particular transmitters are to emit the L3 ITND signals in a data frame can be pre-arranged or controlled by the ITCN network server(s). In some embodiments backhaul (BH) signals may be time-multiplexed with the three-layer LDM signals, allowing an OCR retransmission of backhaul-carrying signals to an IBRS, e.g., as illustrated at 866.

For a single broadcast operator, an in-band ITCN solution may include ITC signals sharing a TV channel with the broadcast services. This enables each broadcast operator to implement its own ITCN within its own channel(s). ITC signal reception at relay SFN transmitters may be affected by the loopback signal from the Tx antenna, as the broadcast transmission signal may be continuously present in time domain.

With the transmission capacity offered by the LDM, multiple broadcast operators can multiplex their programs in fewer channels. Furthermore, shared SFN infrastructure may be feasible for different operators in the same area.

In some embodiments with multiple broadcast operators in a same BCS, a combined ITCN may be implemented using a TV channel dedicated for the ITCN messaging, with two or more broadcast operators sharing it. The operators may divide the ITCN channel capacity using TDM and/or FDM. In this case, time division duplex or frequency division duplex modes could be used for bi-direction or two-way transmissions, which removes interference from loopback signals. For full-duplex transmission mode, dedicated highly directional Rx antennas could be used for ITCN links that could significantly reduce the loopback signal power, or even remove the requirement for loopback signal cancellation.

Figure 16:
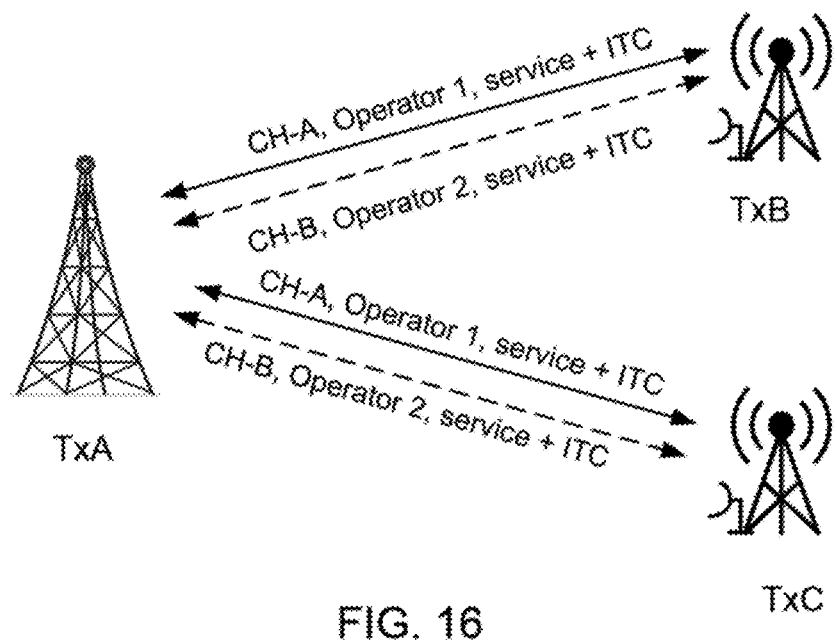
FIG. 16 is a schematic diagram illustrating an example ITCN with two broadcast operators using operator-specific channels to transmit broadcast and ITC signals on shared SFN transmitters.

FIG. 16 illustrates an example of a multi-operator ITCN scenario with two operators sharing the same SFN infrastructure, with different operators using different broadcast channels.

Figure 17:
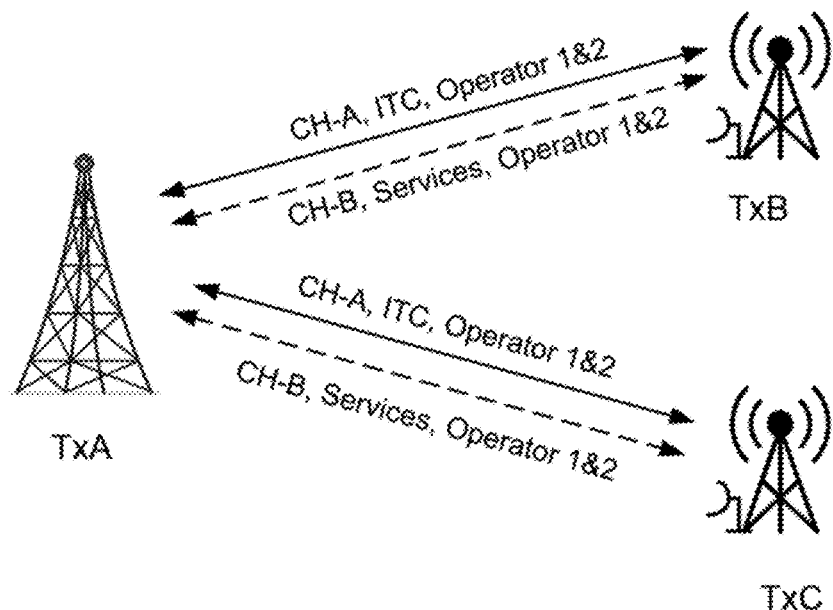
FIG. 17 is a schematic diagram illustrating an example ITCN with two broadcast operators using shared channels to transmit broadcast and ITC signals to different SFN transmitters.

FIG. 17 illustrates an example of a multi-operator ITCN scenario with two operators sharing one channel for broadcast services, e.g., TV, and sharing another channel to transmit ITC signals. In this scenario, the ITC links for the two broadcasters from remote SFN transmitters (Tx-B and Tx-C) to the anchor, or primary, transmitter Tx-A may be time and frequency locked. This may be achieved by, e.g., using GPS devices to control the transmission timing at Tx-B and Tx-C, which are typically present in SFN transmitters.

Figure 18:
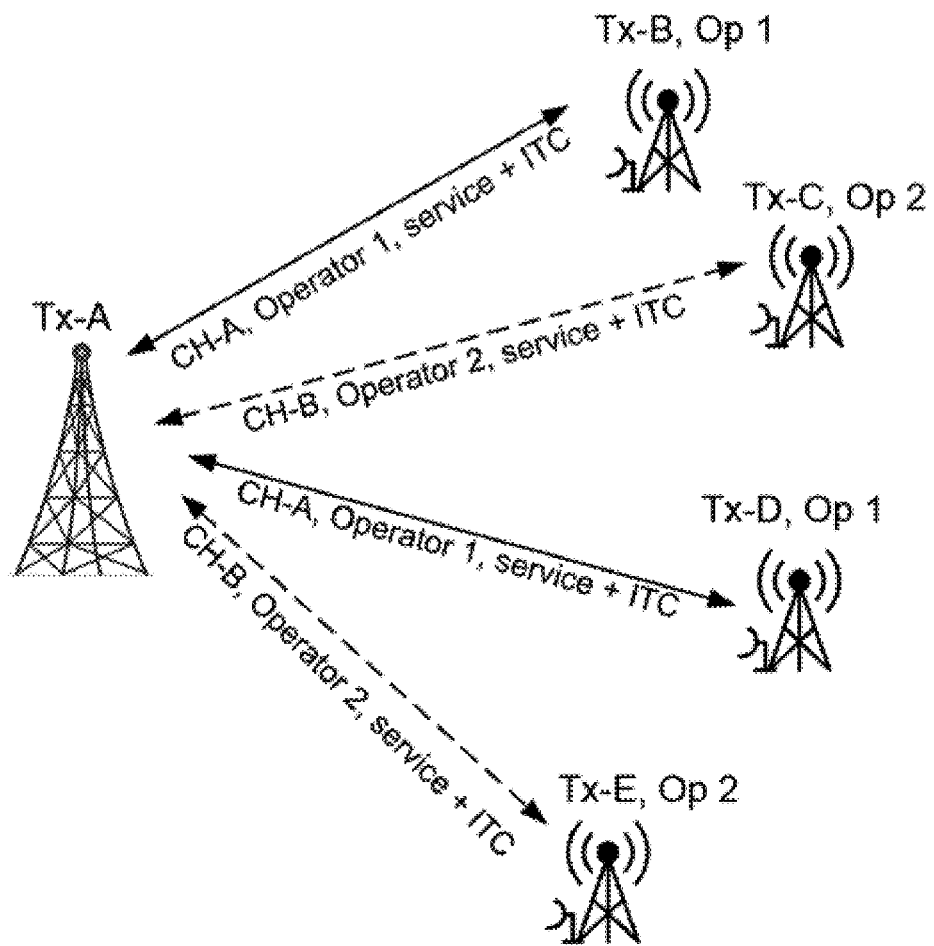
FIG. 18 is a schematic diagram illustrating a BCS with two partially overlapping ITCNs used by two broadcast operators.

FIG. 18 schematically illustrates an example ITCN implementation where two operators share an anchor transmitter, or TTS, "Tx-A" to transmit to different, not shared remote transmitters (TTSs), with a first operator using a first channel "CH-A" to transmit both broadcast service and ITC signals to remote transmitters "Tx-B" and "Tx-D", and a second operator using a second channel "CH-B" to transmit both broadcast service and ITC signals to remote transmitters "Tx-C" and "Tx-E".

Figure 19:
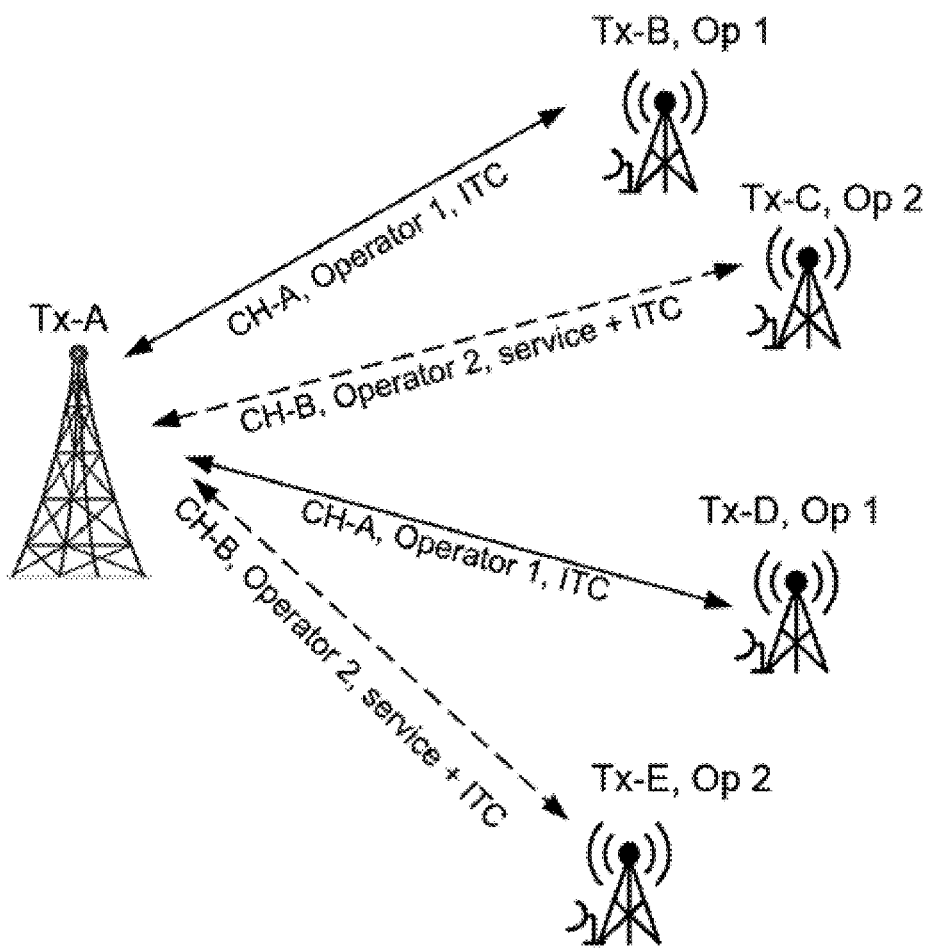
FIG. 19 is a schematic diagram illustrating a BCS having an ITC-dedicated broadcast channel.

FIG. 19 schematically illustrates an example ITCN implementation where two operators share the anchor transmitter (TTS) "Tx-A" to transmit to different remote transmitters, with a first operator using a first channel "CH-A" to transmit only ITC signals to remote transmitters "Tx-B" and "Tx-D", and a second operator using a second channel "Ch-B" to transmit both broadcast service and ITC signals to remote transmitters "Tx-C" and "Tx-E"

Figure 20:
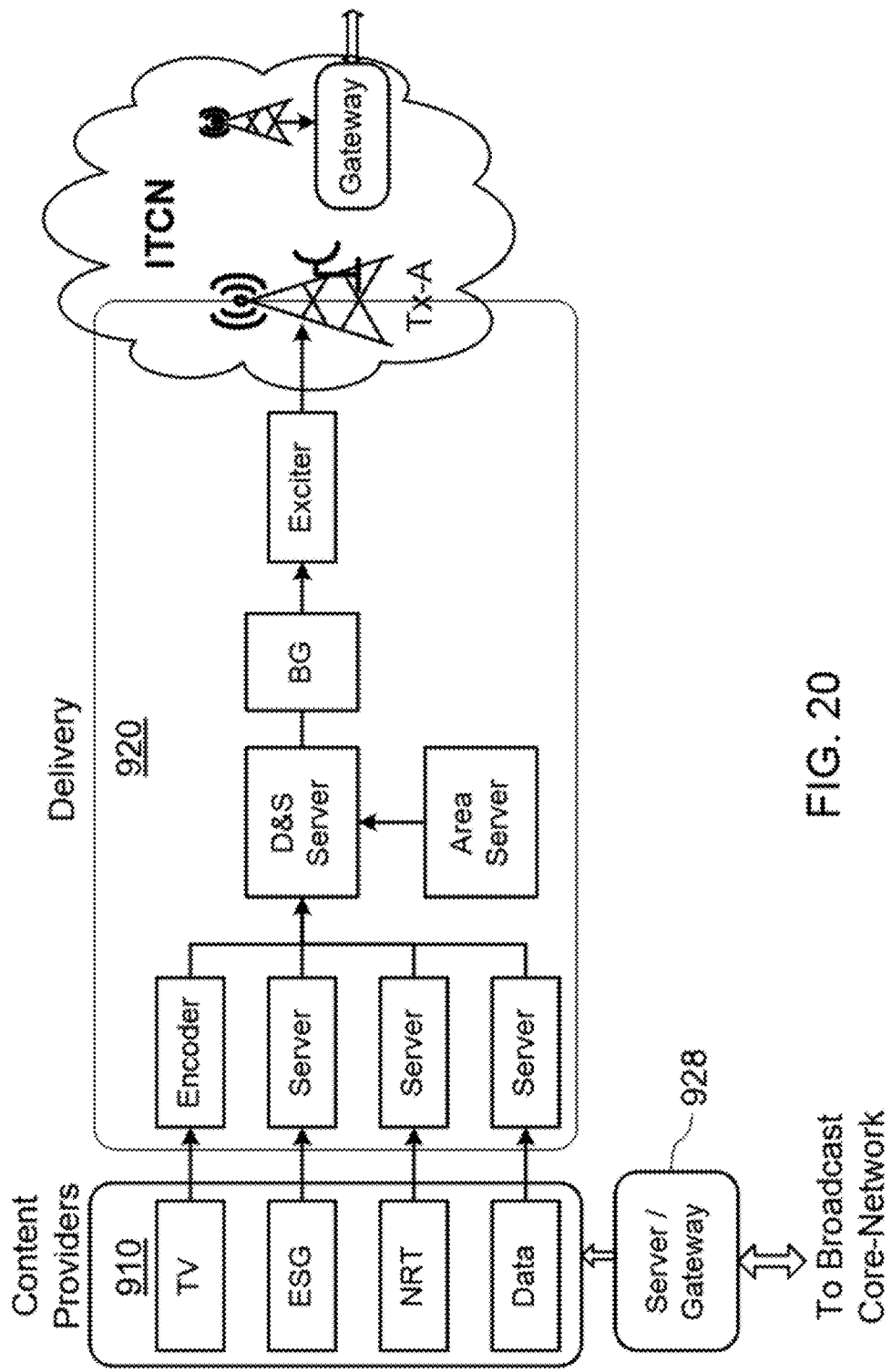
FIG. 20 is a schematic functional diagram of an example BCS headend for an ITCN-integrating BCS.

FIG. 20 schematically illustrates a functional block diagram of an example headend, or broadcast studio, for an ITCN-enabled BCS. The headend may be connected to a broadcast core network (BCN) via a BCN gateway 928. A BCN may comprise one or more other ITCNs, interconnected to form an IITWCN. Information from content providers 910, e.g., some combination of providers of linear TV media signal, electronic service guide (ESG), NRT (non-real time) data, ITC data and messaging, is passed to respective servers or encoders, which connect to a delivery and signalling (D&S) server. The delivery and signalling server passes suitably formatted signals to an exciter via a broadcast gateway, for OTA signal delivery from a TTS "Tx-A" to a plurality end-users and other ITCN-connected TTSs, one or more of which may also be connected to a BCN gateway.

A BCN may be a cloud and IP-based network to connect various broadcast facilities, which may relate to production, contribution, archiving, distribution, and OTA broadcasting. In some embodiments, a BCN may be based on 5G Core Network and can inter-network with 5G Core, making broadcast a part of the 5G eco-system.

In some embodiments, local ITCN servers of a plurality of TTSs participating in an ITCN network may coordinate, e.g., synchronize, the operations of corresponding TTSs to conduct datacasting at certain time frames. Different TTSs may emit different data content at the same time in an SFN environment. In some embodiments TTSs operating in different frequency bands may also be connected by an ITCN to other TTS, e.g., for performing control, monitor, diagnose, data backhaul functions. An ITCN network may be re-configurable and scalable to extend the network or re-route ITC communication signals if some network node/tower is out of service. Broadcasters may also coordinate to use a dedicated broadcast RF channel for ITCN only, absent conventional broadcast service. At times of low broadcast activity, for example at night, the entire RF channel may be used for ITCN data communication and distribution. Participated broadcasters can share the network resource of the ITCN, for example using network slicing.

Combining LDM with TDM and/or FDM multiplexing, and different modulation/coding schemes and reception conditions in an ITCN may enable providing tiered services for different robustness, data rates, and reception conditions. ITC receiving antenna may receive multiple signals from more than one TTS, which may lead to co-channel interference in a SFN environment. Smart adaptive antenna and antenna diversity may be used to reduce co-channel interference levels and multipath distortions. Different reception antennas may be used for OTA ITC signal reception to limit undesired co-channel interference from other transmission towers during the ITC periods. Antenna diversity may facilitate communications with different towers. Some towers can operate as SFN with main transmitters, in which case signal cancellation may be implemented for full-duplex ITCN communications. In some embodiments an ITCN may connect nearby transmission towers that are not part of the SFN and are transmitting on a different frequency, which simplifies ITC signal reception. In some embodiments, an ITCN server of a datacasting TTS may store transmission data of other nearby towers, and may use the stored data to generate an interference waveform to cancel or reduce the impact of the co-channel interference signal from the nearby towers.

Principles and techniques described herein may be used to integrate the delivery of conventional and new generation broadcast services, flexible datacasting services, and point-to-point internet services using OTA broadcast infrastructure and broadcast-allocated frequency bands. In some implementations, broadcast services and ITC signals may be transmitted in separate frequency bands. Multiple ITCN-integrating BCSs may be connected to a core broadcast network (CBN) supporting the delivery of flexible local and shared broadcasting, datacasting, and point-to-point, e.g., internet, services over a broad geographical area. ITCN support may be integrated into a broadcast OCR, which may enable a low-cost broadcast/ITCN relay station providing additional coverage.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Principles and techniques described herein may be adapted to next generation broadband (5G and beyond) systems with point-to-multipoint transmission subsystems based on the description in the present disclosure.

Furthermore, in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Furthermore, it will be appreciated that each of the example embodiments described hereinabove may include features described with reference to other example embodiments.

What is claimed is:
1. A broadcast communication system (BCS) comprising:
a plurality of transmitter tower stations (TTSs) configured to exchange inter-tower communication (ITC) signals to support a wireless ITC network (ITCN), each transmitter tower station (TTS) from the plurality of TTSs comprising:
a transmitter (Tx) antenna,
at least one receiver (Rx) antenna, and
an ITCN server configured to form outgoing ITC signals for transmitting with the Tx antenna and to process incoming ITC signals received with the at least one Rx antenna;
wherein each TTS from the plurality of TTSs is configured to combine the outgoing ITC signals with broadcast services signals prior to the transmitting and to detect the incoming ITC signals in a wireless signal received with the at least one Rx antenna;
wherein the at least one Rx antenna of a first TTS from the plurality of TTSs further comprises a first directional Rx antenna configured to receive wireless signals from a second TTS from the plurality of TTSs and a second directional Rx antenna configured to receive wireless signals from a third TTS, wherein the ITCN server of the first TTS is configured to separately process ITC signals comprised in the wireless signals from the second and third ITC TTSs, and wherein the at least one

Rx antenna of the second TTS comprises a directional Rx antenna configured to receive wireless signals from the first TTS.

2. A broadcast communication system (BCS) comprising:
a plurality of transmitter tower stations (TTSs) configured to exchange inter-tower communication (ITC) signals to support a wireless ITC network (ITCN), each transmitter tower station (TTS) from the plurality of TTSs comprising:
a transmitter (Tx) antenna,
at least one receiver (Rx) antenna, and
an ITCN server configured to form outgoing ITC signals for transmitting with the Tx antenna and to process incoming ITC signals received with the at least one Rx antenna;
wherein each TTS from the plurality of TTSs is configured to combine outgoing ITC signals with broadcast services signals prior to the transmitting and to detect the incoming ITC signals in a wireless signal received with the at least one Rx antenna;
wherein at least one of the ITCN servers comprises data storage for storing at least one of:
datacasting services data, local services data, ITCN management data, and backhaul information for local broadcasting, and wherein the at least one of the ITCN servers is configured to select stored data for at least one of: transmitting to another TTS with an outgoing ITC signal, or broadcasting to a local broadcast area with the broadcast services signals.

3. The BCS of claim 2 wherein at least one of the TTSs is configured to relay ITC signals, or signals or data comprised in said ITC signals, between two other TTSs from the plurality of TTSs.

4. The BCS of claim 2 wherein the at least one Rx antenna of a first TTS from the plurality of TTSs comprises a directional Rx antenna configured to receive wireless signals from a second TTS from the plurality of TTSs, and wherein the first TTS comprises a controller operable to redirect the directional Rx antenna to receive wireless signals from a third TTS that is different from the second TTS.

5. The BCS of claim 2, wherein the broadcast services signals comprise broadcast TV signals, and wherein at least some of the ITCN servers are configured to support two-way internet protocol (IP) communications carried by the ITC signals multiplexed with the broadcast TV signals.

6. The BCS of claim 2, wherein the at least one of the ITCN servers comprises a packet network interface for communicating with an external packet network, and a packet traffic controller configured to process data packets received from the interface for storing at the at least one of the ITCN servers or transmission with the outgoing ITC signals, and to process data packets received with the incoming ITC signals for storing at the ITCN server or routing to the external packet network.

7. The BCS of claim 2 wherein at least some TTSs from the plurality of TTSs are configured to multiplex the outgoing ITC signals with the broadcast services signals using at least one of: layered division multiplexing (LDM), time domain multiplexing (TDM), and frequency domain multiplexing (FDM).

8. The BCS of claim 2 wherein at least one TTS from the plurality of TTSs is configured to transmit the broadcast services signals and the outgoing ITC signals in different frequency bands.

9. The BCS of claim 2 wherein at least one TTS from the plurality of TTSs is configured for receiving the incoming ITC signals in a frequency band different from a transmission frequency band of said at least one TTS.

10. The BCS of claim 2 wherein at least one TTS from the plurality of TTSs comprises an on-channel repeater (OCR) configured for re-transmitting a signal wirelessly received from another TTS, the OCR being configured to superimpose the outgoing ITC signals upon the received signal prior to re-transmitting.

11. The BCS according to claim 10 wherein the OCR comprises a circuit for extracting the incoming ITC signals from the wirelessly received signal.

12. The BCS of claim 2 configured as a single-frequency network wherein the plurality of TTSs transmit the broadcast services signals and the outgoing ITC signals in a same shared frequency band, wherein at least one of the TTSs from the plurality of TTSs is configured to receive the incoming ITC signals from a second wireless network over a different frequency band, for supporting an integrated inter-tower wireless network comprising the BCS and the second wireless network.

13. A broadcast communication system BCS) comprising:
a plurality of transmitter tower stations (TTSs) comprising transmitter (Tx) antennas, the plurality of TTSs comprising:
a first transmitter tower station (TTS) configured to wirelessly transmit a first Tx signal comprising a broadcast service signal and an inter-tower communication (ITC) signal, and
a second TTS configured to wirelessly transmit a second Tx signal comprising a broadcast service signal and an ITC signal;
wherein each of the first and second TTSs comprises at least one receiver (Rx) antenna for receiving one of the ITC signals originating from the other of the first and second TTSs, wherein the Rx antennas of the first and second TTSs are configured to support a bi-directional ITC link between the first TTS and the second TTS; and
first and second ITC network (ITCN) servers in communication with the first and second TTS, respectively, for supporting an ITC network comprising the first and second TTSs;
wherein at least one of the ITCN servers comprises a packet network interface for communications with a packet communications network external to the BCS, data storage for storing at least one of: ITCN management data, datacasting data, and local services data, and one or more processors configured to support at least one of: datacasting, a data carousel, backhaul content and data storage, and packet routing.

14. The BCS according to claim 13 wherein at least one of the Rx antennas comprises a directional Rx antenna, the directional Rx antenna being reconfigurable for receiving wireless signals selectively from different TTSs of the BCS.

15. The BCS according to claim 13 wherein the first TTS is configured to combine a backhaul signal with the ITC signal using LDM.

16. The BCS according to claim 13 wherein the first and second TTSs are configured to transmit the ITC signals in a broadcast-allocated channel using a full-duplex or a half-duplex transmission mode.

17. The BCS according to claim 13 including a third TTS comprising a third ITCN server, and wherein each of the ITCN servers is configured to communicate with at least another one of the ITCN servers using the ITC signals to route ITC data transmission between the first and second TTSs via the third TTS.

* * * * *